US010419647B2

(12) United States Patent
Park et al.

(10) Patent No.: US 10,419,647 B2
(45) Date of Patent: Sep. 17, 2019

(54) OVEN

(71) Applicant: SAMSUNG ELECTRONICS CO., LTD., Suwon-si, Gyeonggi-do (KR)

(72) Inventors: Sang Jun Park, Yongin-si (KR); Woo Joo Kim, Suwon-si (KR); Min Ho Yun, Suwon-si (KR); Yeo-Wool Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 322 days.

(21) Appl. No.: 15/200,621

(22) Filed: Jul. 1, 2016

(65) Prior Publication Data
US 2017/0000292 A1   Jan. 5, 2017

(30) Foreign Application Priority Data
Jul. 3, 2015 (KR) ........................ 10-2015-0094975

(51) Int. Cl.
F24C 7/08      (2006.01)
H04N 5/225     (2006.01)
G03B 29/00     (2006.01)
F24C 15/04     (2006.01)
G03B 15/03     (2006.01)
A21B 3/10      (2006.01)
F24C 15/00     (2006.01)

(52) U.S. Cl.
CPC .......... H04N 5/2252 (2013.01); F24C 7/085 (2013.01); F24C 15/04 (2013.01); G03B 15/03 (2013.01); G03B 29/00 (2013.01); H04N 5/2257 (2013.01); A21B 3/10 (2013.01); F24C 15/008 (2013.01)

(58) Field of Classification Search
CPC .......... F24C 7/08; F24C 7/085; F24C 15/008; F24C 15/04; A21B 3/10
USPC .......... 99/325, 331, 332, 333, 341; 219/393, 219/411, 506
See application file for complete search history.

(56) References Cited

U.S. PATENT DOCUMENTS 5,361,681 A *  11/1994  Hedstrom ............... F24C 7/087
                                                219/413
7,696,454 B2 *  4/2010  Nam ....................... F24C 7/082
                                                219/393
2003/0025801 A1  2/2003  Yamakawa
2003/0048081 A1  3/2003  Seemann
(Continued)

FOREIGN PATENT DOCUMENTS

CN    203263109    11/2013
EP    2515044      10/2012
(Continued)

OTHER PUBLICATIONS

International Search Report dated Oct. 13, 2016 in corresponding International Patent Application No. PCT/KR2016/007123.
(Continued)

Primary Examiner — Reginald Alexander
(74) Attorney, Agent, or Firm — Staas & Halsey LLP

(57) ABSTRACT

Disclosed herein is an oven including a monitoring unit which monitors a cooking compartment and transmits data obtained by the monitoring to an external device through a network to allow a user to check a cooking process of the oven through the external device without directly checking the oven through a transparent portion thereof to provide convenience to the user.

19 Claims, 38 Drawing Sheets

(56) References Cited

U.S. PATENT DOCUMENTS

| | | |
|---|---|---|
| 2003/0071031 A1 | 4/2003 | Gerola |
| 2003/0106065 A1 | 6/2003 | Goto |
| 2003/0112337 A1 | 6/2003 | Akiba |
| 2003/0158796 A1 | 8/2003 | Balent |
| 2003/0190076 A1 | 10/2003 | Bruno |
| 2003/0234809 A1 | 12/2003 | Rhoten |
| 2004/0003051 A1 | 1/2004 | Gittleman |
| 2004/0012192 A1 | 1/2004 | Dixon |
| 2004/0120844 A1 | 6/2004 | Tribelsky |
| 2004/0172380 A1 | 9/2004 | Zhang |
| 2004/0214123 A1 | 10/2004 | Beyer |
| 2004/0217498 A1 | 11/2004 | Ondrus |
| 2004/0249843 A1 | 12/2004 | Damrath |
| 2004/0258274 A1 | 12/2004 | Brundage |
| 2005/0000367 A1 | 1/2005 | Meade |
| 2005/0015487 A1 | 1/2005 | Motoyama |
| 2005/0039197 A1 | 2/2005 | Ahmad |
| 2005/0059266 A1 | 3/2005 | Lee |
| 2005/0061958 A1 | 3/2005 | Baier |
| 2005/0082703 A1 | 4/2005 | Wrosz |
| 2005/0144294 A1 | 6/2005 | Gellens |
| 2005/0225076 A1 | 10/2005 | McCreary |
| 2005/0251275 A1 | 11/2005 | Carlson |
| 2006/0000872 A1 | 1/2006 | Nakagawa |
| 2006/0070530 A1 | 4/2006 | Meade |
| 2006/0109345 A1 | 5/2006 | Stenger |
| 2006/0119707 A1 | 6/2006 | Merrell |
| 2006/0159444 A1 | 7/2006 | Mokunaka |
| 2006/0218057 A1 | 9/2006 | Fitzpatrick |
| 2006/0278710 A1 | 12/2006 | Park |
| 2007/0007279 A1 | 1/2007 | Chun |
| 2007/0026958 A1 | 2/2007 | Barasch |
| 2007/0029306 A1 | 2/2007 | Chun |
| 2007/0065160 A1 | 3/2007 | Shinohara |
| 2007/0090099 A1 | 4/2007 | Gillen |
| 2007/0114224 A1 | 5/2007 | Nagamitsu |
| 2007/0136768 A1 | 6/2007 | Kumar |
| 2007/0143456 A1 | 6/2007 | Mashinsky |
| 2007/0219426 A1 | 9/2007 | Moore |
| 2007/0219430 A1 | 9/2007 | Moore |
| 2007/0251521 A1 | 11/2007 | Schackmuth |
| 2007/0254080 A1 | 11/2007 | Schackmuth |
| 2008/0001735 A1 | 1/2008 | Tran |
| 2008/0010856 A1 | 1/2008 | Hakkala |
| 2008/0028083 A1 | 1/2008 | Rezvani |
| 2008/0030074 A1 | 2/2008 | Duong |
| 2008/0037727 A1 | 2/2008 | Sivertsen |
| 2008/0057929 A1 | 3/2008 | Min |
| 2008/0115053 A1 | 5/2008 | Candela |
| 2008/0195666 A1 | 8/2008 | Chi |
| 2008/0199080 A1 | 8/2008 | Subbiah |
| 2008/0240519 A1 | 10/2008 | Nagamitsu |
| 2008/0264708 A1 | 10/2008 | Grange et al. |
| 2008/0266945 A1 | 10/2008 | Hou et al. |
| 2008/0270541 A1 | 10/2008 | Keener et al. |
| 2008/0279005 A1 | 11/2008 | France |
| 2008/0280389 A1 | 11/2008 | Wang et al. |
| 2008/0313872 A1 | 12/2008 | Hurst et al. |
| 2009/0001599 A1 | 1/2009 | Foong et al. |
| 2009/0016402 A1 | 1/2009 | Bunker et al. |
| 2009/0046511 A1 | 2/2009 | Ch'ng et al. |
| 2009/0049231 A1 | 2/2009 | Pui et al. |
| 2009/0051043 A1 | 2/2009 | Wong et al. |
| 2009/0083327 A1 | 3/2009 | Ringham et al. |
| 2009/0106483 A1 | 4/2009 | Cherpantier |
| 2009/0106563 A1 | 4/2009 | Cherpantier |
| 2009/0106577 A1 | 4/2009 | Cherpantier et al. |
| 2009/0106626 A1 | 4/2009 | Hou et al. |
| 2009/0109742 A1 | 4/2009 | Fook et al. |
| 2009/0119447 A1 | 5/2009 | Lee et al. |
| 2009/0129172 A1 | 5/2009 | Kim et al. |
| 2009/0129412 A1 | 5/2009 | Kim |
| 2009/0138628 A1 | 5/2009 | Kanade |
| 2009/0144045 A1 | 6/2009 | Kanade |
| 2009/0144577 A1 | 6/2009 | Sarker |
| 2009/0145957 A1 | 6/2009 | Zancola |
| 2009/0146201 A1 | 6/2009 | Zheng et al. |
| 2009/0147589 A1 | 6/2009 | Kathawala et al. |
| 2009/0149200 A1 | 6/2009 | Jayasinghe et al. |
| 2009/0158423 A1 | 6/2009 | Orlassino |
| 2009/0161430 A1 | 6/2009 | Allen et al. |
| 2009/0161462 A1 | 6/2009 | Chung et al. |
| 2009/0164696 A1 | 6/2009 | Allen |
| 2009/0164703 A1 | 6/2009 | Racino |
| 2009/0164750 A1 | 6/2009 | Atri et al. |
| 2009/0164836 A1 | 6/2009 | Carmichael |
| 2009/0172250 A1 | 7/2009 | Allen et al. |
| 2009/0265277 A1 | 10/2009 | Mullen |
| 2009/0265740 A1 | 10/2009 | Mullen |
| 2009/0271002 A1 | 10/2009 | Asofsky |
| 2009/0300312 A1 | 12/2009 | Handschuh et al. |
| 2009/0300318 A1 | 12/2009 | Allen et al. |
| 2010/0005445 A1 | 1/2010 | Argue et al. |
| 2010/0014749 A1 | 1/2010 | Turlure |
| 2010/0070197 A1 | 3/2010 | Wang et al. |
| 2010/0106607 A1 | 4/2010 | Riddiford et al. |
| 2010/0115254 A1 | 5/2010 | Deng et al. |
| 2010/0119755 A1 | 5/2010 | Rathod |
| 2010/0129803 A1 | 5/2010 | Gosalvez Berenguer et al. |
| 2010/0134620 A1 | 6/2010 | Bielstein |
| 2010/0177165 A1 | 7/2010 | Oh et al. |
| 2010/0177710 A1 | 7/2010 | Gutkin et al. |
| 2010/0226943 A1 | 9/2010 | Brennan et al. |
| 2010/0227029 A1 | 9/2010 | Ernst et al. |
| 2010/0244298 A1 | 9/2010 | Mie |
| 2010/0314234 A1 | 12/2010 | Knoch et al. |
| 2010/0321152 A1 | 12/2010 | Argudyaev et al. |
| 2010/0321486 A1 | 12/2010 | Pado et al. |
| 2010/0332404 A1 | 12/2010 | Valin |
| 2011/0038057 A1 | 2/2011 | Dharmatilleke et al. |
| 2011/0063606 A1 | 3/2011 | Babiarz et al. |
| 2011/0084831 A1 | 4/2011 | Tran |
| 2011/0093903 A1 | 4/2011 | Huang et al. |
| 2011/0115624 A1 | 5/2011 | Tran |
| 2011/0119293 A1 | 5/2011 | Taylor et al. |
| 2011/0123689 A1 | 5/2011 | Luckhardt et al. |
| 2011/0129577 A1 | 6/2011 | De Chilly et al. |
| 2011/0132201 A1 | 6/2011 | Richardson et al. |
| 2011/0146879 A1 | 6/2011 | Dugand et al. |
| 2011/0155200 A1 | 6/2011 | Simka |
| 2011/0167100 A1 | 7/2011 | Brodowski |
| 2011/0168443 A1 | 7/2011 | Smolka |
| 2011/0208619 A1 | 8/2011 | Siounis et al. |
| 2011/0244846 A1 | 10/2011 | Min |
| 2011/0268311 A1 | 11/2011 | Hudnut et al. |
| 2011/0273558 A1 | 11/2011 | Subbiah et al. |
| 2011/0276396 A1 | 11/2011 | Rathod |
| 2011/0289537 A1 | 11/2011 | Buehl |
| 2011/0316667 A1 | 12/2011 | Tran |
| 2012/0047536 A1 | 2/2012 | Janik et al. |
| 2012/0066398 A1 | 3/2012 | Jo |
| 2012/0120994 A1 | 5/2012 | Sherman et al. |
| 2012/0128143 A1 | 5/2012 | Rudman |
| 2012/0130761 A1 | 5/2012 | Mohan |
| 2012/0166533 A1 | 6/2012 | Rubinstein et al. |
| 2012/0235636 A1 | 9/2012 | Partovi |
| 2012/0265348 A1 | 10/2012 | Kim et al. |
| 2012/0282914 A1 | 11/2012 | Alexander |
| 2012/0309381 A1 | 12/2012 | Almeda et al. |
| 2012/0310971 A1 | 12/2012 | Tran |
| 2012/0324252 A1 | 12/2012 | Sarker |
| 2012/0328747 A1 | 12/2012 | Levy |
| 2012/0328953 A1 | 12/2012 | Hirohashi et al. |
| 2013/0046781 A1 | 2/2013 | Frankel et al. |
| 2013/0067726 A1 | 3/2013 | Kuriki et al. |
| 2013/0135194 A1 | 5/2013 | Josephson et al. |
| 2013/0135195 A1 | 5/2013 | Josephson et al. |
| 2013/0140355 A1 | 6/2013 | Qu et al. |
| 2013/0147970 A1 | 6/2013 | Herring et al. |
| 2013/0152176 A1 | 6/2013 | Courtney et al. |
| 2013/0169061 A1 | 7/2013 | Miroshnichenko |
| 2013/0171304 A1 | 7/2013 | Huntley |
| 2013/0179288 A1 | 7/2013 | Moses |
| 2013/0182974 A1 | 7/2013 | Smith |

(56) References Cited

U.S. PATENT DOCUMENTS

| | | |
|---|---|---|
| 2013/0201316 A1 | 8/2013 | Binder |
| 2013/0213483 A1 | 8/2013 | Bagwell |
| 2013/0214935 A1 | 8/2013 | Kim |
| 2013/0216670 A1 | 8/2013 | Willcocks |
| 2013/0222367 A1 | 8/2013 | Mariappan |
| 2013/0229492 A1 | 9/2013 | Ose |
| 2013/0240618 A1 | 9/2013 | Hall |
| 2013/0247078 A1 | 9/2013 | Nikankin |
| 2013/0248583 A1 | 9/2013 | Ham |
| 2013/0300204 A1 | 11/2013 | Partovi |
| 2013/0306627 A1 | 11/2013 | Atzmony |
| 2014/0007157 A1 | 1/2014 | Harrison |
| 2014/0007162 A1 | 1/2014 | Harrison |
| 2014/0012831 A1 | 1/2014 | Wallen |
| 2014/0026762 A1 | 1/2014 | Riefenstein |
| 2014/0041530 A1 | 2/2014 | Luckhardt |
| 2014/0048055 A1 | 2/2014 | Ruther |
| 2014/0096590 A1 | 4/2014 | Amin |
| 2014/0119636 A1 | 5/2014 | Nava |
| 2014/0158675 A1 | 6/2014 | Jing |
| 2014/0158753 A1 | 6/2014 | Sisselman |
| 2014/0162598 A1 | 6/2014 | Villa-Real |
| 2014/0176696 A1 | 6/2014 | Chapman |
| 2014/0218722 A1 | 8/2014 | Meeks |
| 2014/0230039 A1 | 8/2014 | Prakash |
| 2014/0242227 A1 | 8/2014 | Yang |
| 2014/0244536 A1 | 8/2014 | Far-Hadian |
| 2014/0251987 A1 | 9/2014 | Reay |
| 2014/0262139 A1 | 9/2014 | Choi |
| 2014/0278936 A1 | 9/2014 | Fescenmeyer |
| 2014/0313331 A1 | 10/2014 | Kim |
| 2014/0333671 A1 | 11/2014 | Phang |
| 2014/0334691 A1 | 11/2014 | Cho |
| 2014/0347182 A1 | 11/2014 | Poursohi |
| 2014/0364111 A1 | 12/2014 | Almeda |
| 2014/0365345 A1 | 12/2014 | Isogai |
| 2014/0375437 A1 | 12/2014 | Rezvani |
| 2014/0375438 A1 | 12/2014 | Rezvani |
| 2014/0375439 A1 | 12/2014 | Rezvani |
| 2014/0375440 A1 | 12/2014 | Rezvani |
| 2014/0375441 A1 | 12/2014 | Rezvani |
| 2015/0048824 A1 | 2/2015 | Bohi |
| 2015/0051991 A1 | 2/2015 | Riddiford |
| 2015/0056344 A1 | 2/2015 | Luckhardt |
| 2015/0058406 A1 | 2/2015 | Rezvani |
| 2015/0285512 A1* | 10/2015 | Matarazzi ............... F24C 15/00 99/341 |
| 2015/0330640 A1* | 11/2015 | Stork genannt Wersborg ............. F24C 7/08 99/332 |

FOREIGN PATENT DOCUMENTS

| | | |
|---|---|---|
| JP | 2012-54253 | 3/2012 |
| KR | 10-2010-0087627 | 8/2010 |
| KR | 10-2010-0122425 | 11/2010 |
| KR | 10-2014-0144504 | 12/2014 |
| KR | 10-2015-0026378 | 3/2015 |
| WO | 2016/034295 | 3/2016 |

OTHER PUBLICATIONS

Extended European Search Report dated Apr. 30, 2018 in European Patent Application No. 16821592.9.

Chinese Patent Office issued First Office Action in Chinese Patent Application No. 201680039508.X dated Jan. 3, 2019 (17 Total pages).

European Patent Office issued Communication pursuant to Article 94(3) EPC in Application No. 16821592.9-1208 dated Dec. 21, 2018 (4 pages).

\* cited by examiner

OVEN

CROSS-REFERENCE TO RELATED APPLICATIONS

This application claims the benefit of Korean Patent Application No. 10-2015-0094975, filed on Jul. 3, 2015 in the Korean Intellectual Property Office, the disclosure of which is incorporated herein by reference.

BACKGROUND

1. Field

Embodiments of the present disclosure relate to an oven, and more particularly, to a camera unit which observes an inside of an oven.

2. Description of the Related Art

Generally, ovens are apparatuses which include a cooking compartment, a heater applying heat to the cooking compartment, and a circulating fan circulating heat generated by the heater in the cooking compartment to cook foods.

Ovens are cooking utensils for sealing and heating ingredients to cook, and are generally classified into an electric type, a gas type, and an electronic type depending on a heat source thereof. Electric ovens use an electric heater as a heating source, and gas ovens and microwave ovens use heat using gases and frictional heat of water molecules caused by high frequency waves as heat sources, respectively.

During a process of cooking using an oven, cases where checking a state to add seasonings occur frequently. Whenever such cases occur, there are inconveniences of going to the oven to check through a transparent window or to open an oven door to check.

Also, situations of cooking other foods or checking a cooking state while entertaining guests may occur and such situations are cumbersome.

SUMMARY

Therefore, it is an aspect of the present disclosure to provide an oven which allows a process of cooking food to be simply checked through the oven while cooking.

Additional aspects of the present disclosure will be set forth in part in the description which follows and, in part, will be obvious from the description, or may be learned by practice of the present disclosure.

In accordance with one aspect of the present disclosure, an oven includes a case, a cooking compartment provided in the case, a door provided to open and close the cooking compartment, and a monitoring unit which includes a camera module positioned outside the door to take an image of an inside of the cooking compartment.

The door may include a transparent portion configured to allow the cooking compartment to be seen from an outside of the oven, and the monitoring unit may be provided to take the image of the inside of the cooking compartment through the transparent portion.

The monitoring unit may be positioned on an outer surface of the transparent portion.

The monitoring unit may further include a communication board which transmits information obtained by the camera module to an external device through a network.

The camera module may be disposed to be inclined with respect to an outer surface of the door.

The monitoring unit may further include a housing, and the communication board may be disposed to be adjacent to an inner surface of the housing.

The housing may include a first housing in which the camera module and the communication board are mounted and a second housing provided to be attachable to an outer surface of the door and separable from the first housing.

The second housing may include an opening portion to allow the camera module to take the image of the inside of the cooking compartment.

An inner surface of the first housing may include a first mounting portion on which the camera module is mounted and a second mounting portion on which the communication board is mounted.

The oven may further include a micom which controls the monitoring unit; and a cable which electrically connects the micom to the monitoring unit.

A part of the cable may be disposed inside the door and may pass through the door to be connected to the monitoring unit.

The cable may include a first cable disposed inside the door and a second cable disposed inside the case, and the first cable and the second cable may be separably provided.

The door may be provided to be separable form the case, and the first cable and the second cable may be provided to be separable from each other when the door is separated.

The camera module may obtain image information by taking the image of the inside of the cooking compartment, and the communication board may transmit the image information obtained by the camera module to the external device through the network.

The camera module may obtain a plurality of pieces of image information by multiply taking the image of the inside of the cooking compartment with time differences, and the communication board may sequentially transmit the plurality of pieces of image information obtained by the camera module to the external device through the network.

The camera module may obtain moving image information by taking a moving image of the inside of the cooking compartment, and the communication board may transmit the moving image information obtained by the camera module to the external device through the network.

In accordance with another aspect of the present disclosure, an oven includes a case, a cooking compartment provided in the case, and a monitoring unit which takes an image of an inside of the cooking compartment and transmits image information to an external device through a network.

The monitoring unit may receive image-taking control information from the external device and may take the image of the inside of the cooking compartment according thereto.

A lighting unit may be provided in the cooking compartment, and the lighting unit may be turned on before the monitoring unit takes the image of the inside of the cooking compartment.

The lighting unit may be turned off after the image-taking of the monitoring unit is finished The monitoring unit may obtain the image information by taking the image of the inside of the cooking compartment and may transmit the image information according thereto to the external device through the network.

The monitoring unit may obtain a plurality of pieces of image information by repeatedly taking the image of the inside of the cooking compartment with time differences and may sequentially transmit the plurality of pieces of image information according thereto to the external device through the network.

The monitoring unit may obtain moving image information by taking a moving image of the inside of the cooking compartment and may transmit the moving image information according thereto to the external device through the network.

The oven may include the door which opens and closes the cooking compartment and includes the transparent portion provided to allow the inside of the cooking compartment to be seen, and the monitoring unit may monitor the cooking compartment outside the door through the transparent portion.

In accordance with still another aspect of the present disclosure, an oven includes a body, a cooking compartment formed in the body, a transparent portion provided in at least a part of the body to show an inside of the cooking compartment, a camera module provided to take the image of the inside of the cooking compartment through the transparent portion, and a communication board which transmits information obtained by the camera module to an external device through a network.

The camera module is disposed on an outer surface of the transparent portion.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Figure 1:
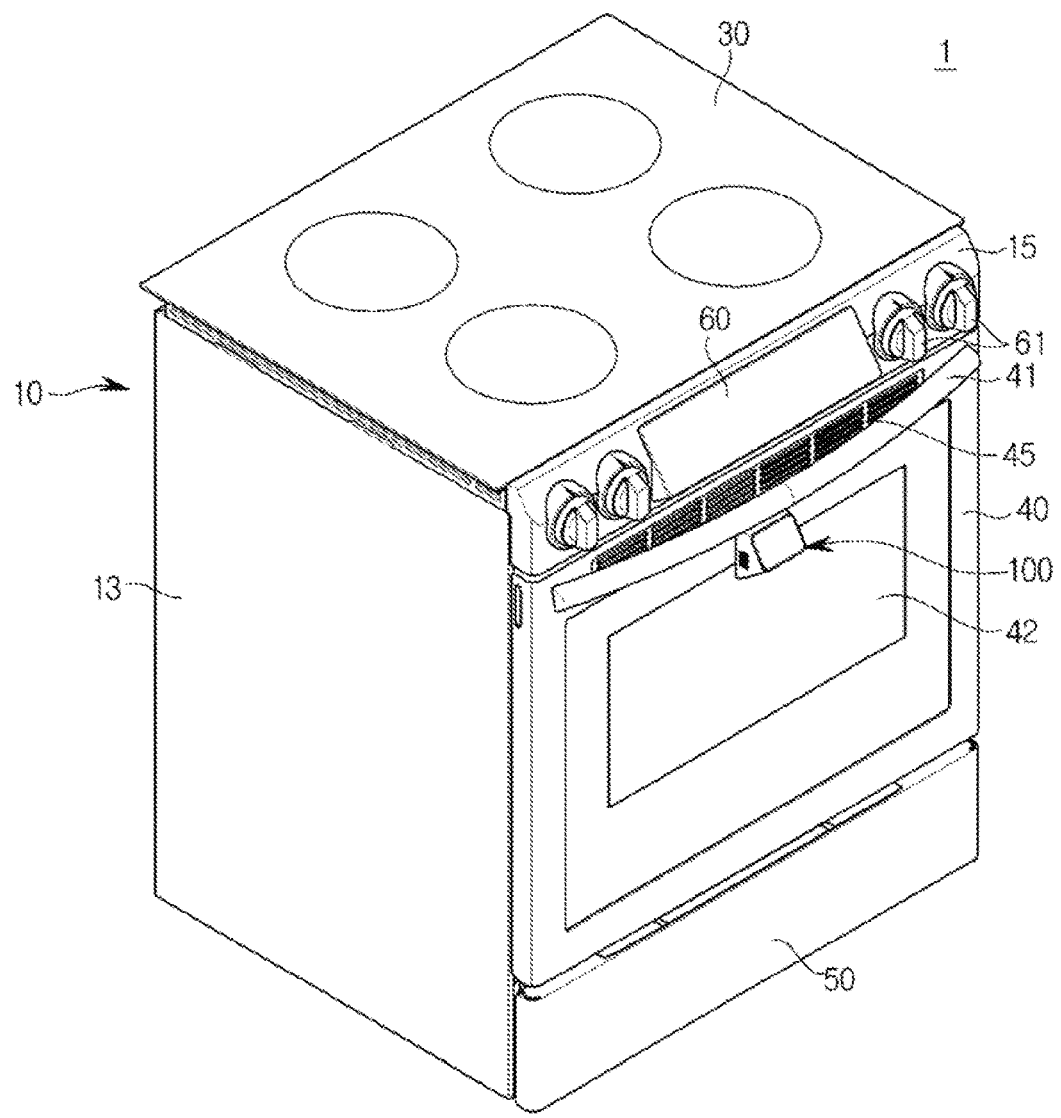
FIG. 1 is a perspective view of an oven in accordance with one embodiment of the present disclosure.

Embodiments described herein and configurations shown in the drawings are merely exemplary examples. Also, various modified examples with which these embodiments and the drawings could be replaced may be present at the time of filing of the present application.

Also, throughout the drawings, like reference numerals or symbols designate like components or elements which perform substantially identical functions.

Also, the terms used herein explain the embodiments but are not intend to restrict and/or limit the present disclosure. Singular expressions include plural expressions unless otherwise defined in context. Throughout the specification, the terms "comprise" or "have", etc. are used herein to specify the presence of stated features, numbers, steps, operations, elements, components or combinations thereof but do not preclude the presence or addition of one or more other features, numbers, steps, operations, elements, components, or combinations thereof.

Also, it should be understood that although the terms "first", "second", etc. may be used herein to describe various components, these components are not limited by these terms. These terms are only used to distinguish one component from another. For example, without departing from the scope of the present disclosure, a first component may be referred to as a second component, and similarly, the second component may be referred to as the first component. The term "and/or" includes any and all combinations or one of a plurality of associated listed items.

Hereinafter, embodiments of the present disclosure will be described in detail with reference to the attached drawings.

A front side and a front used hereinafter refer to a direction facing a front side and a front of an oven 1 shown in FIG. 1, and a rear refers to a direction facing a rear of the oven 1.

Figure 2:
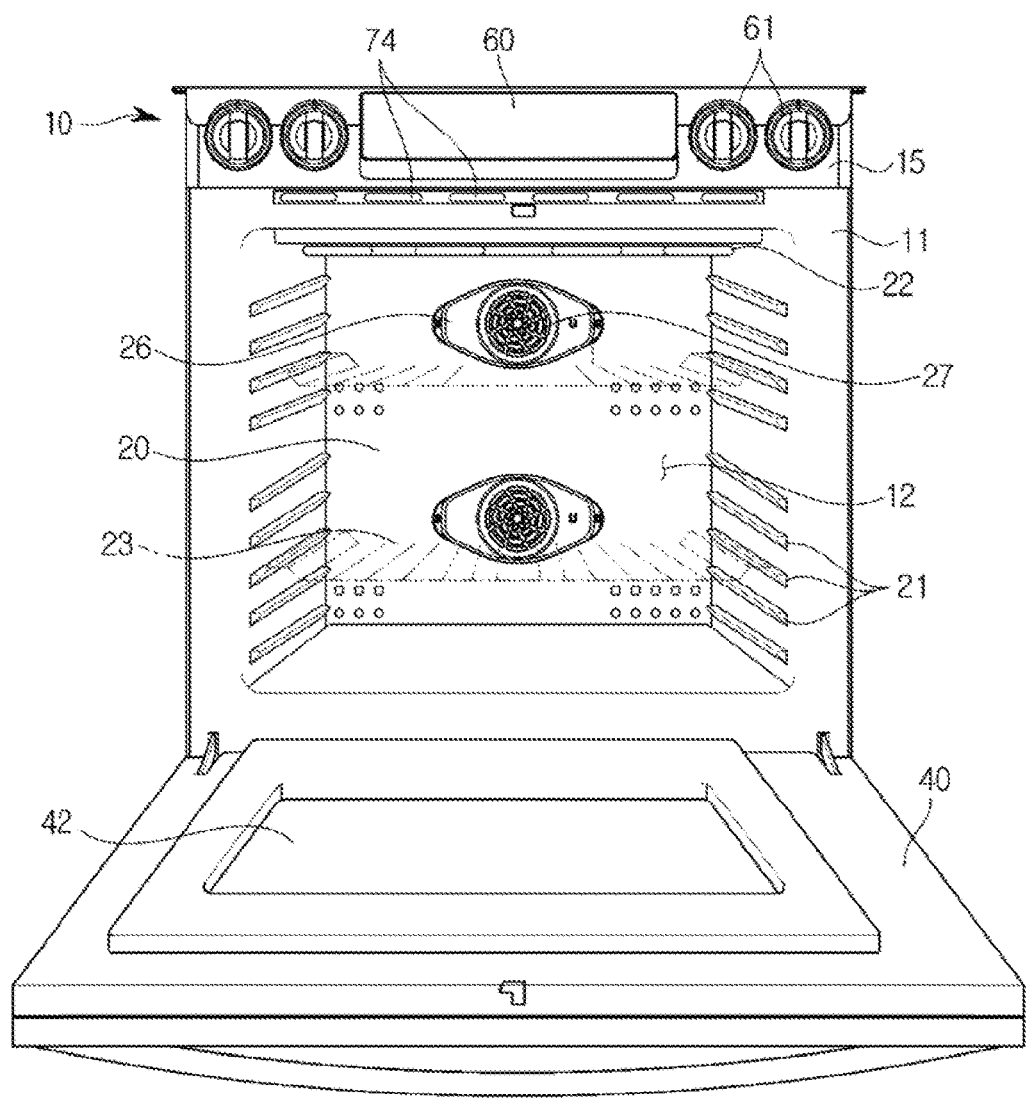
FIG. 2 is a view illustrating a state in which a door in accordance with one embodiment of the present disclosure is opened.
Figure 3:
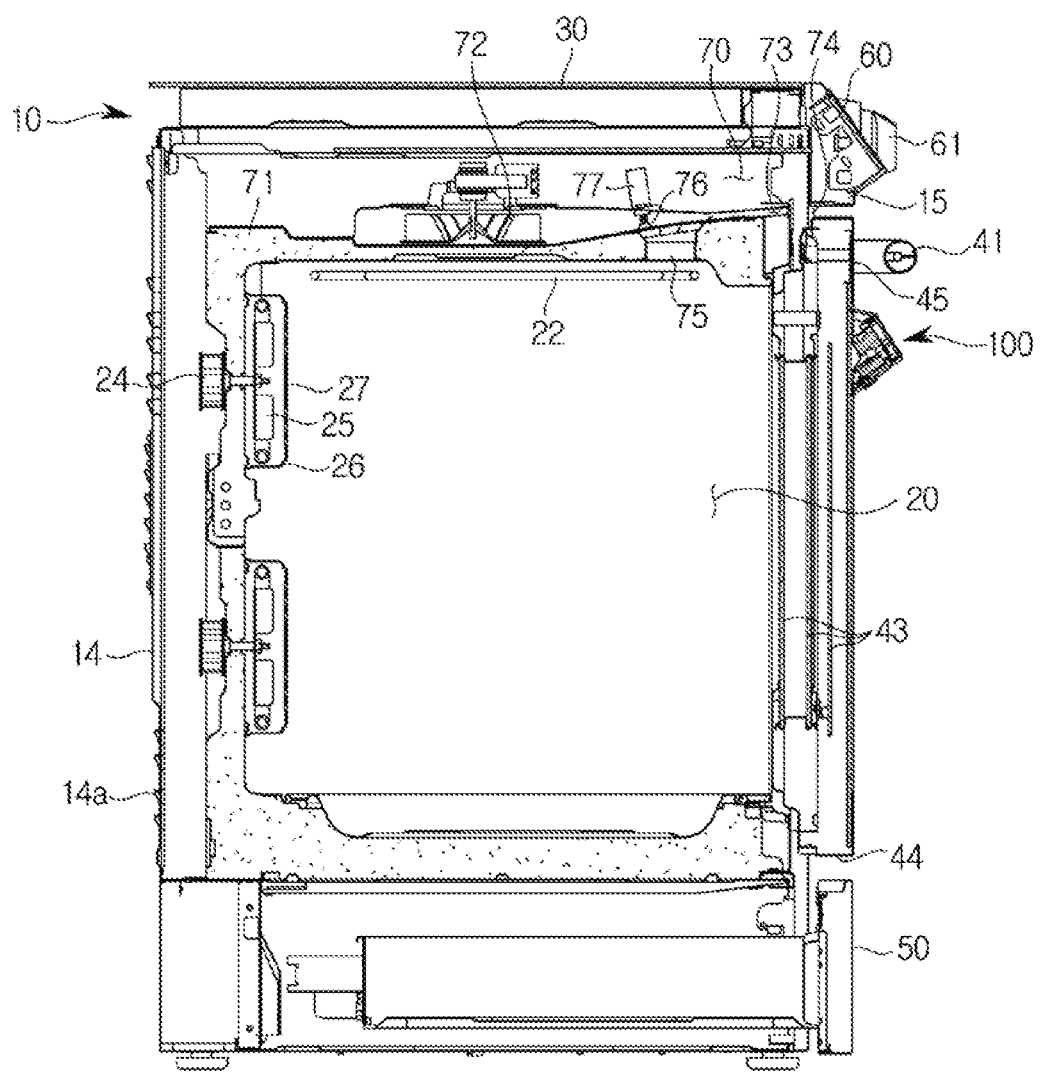
FIG. 3 is a side cross-sectional view of the oven in accordance with one embodiment of the present disclosure.

FIG. 1 is a perspective view of an oven in accordance with one embodiment of the present disclosure. FIG. 2 is a view illustrating a state in which a door of the oven in accordance with one embodiment of the present disclosure is opened. FIG. 3 is a side cross-sectional view of the oven in accordance with one embodiment of the present disclosure.

The oven 1 (or a body including a case and a door, hereinafter, referred to as the oven 1) may include a case 10 which forms an exterior, a cooking compartment 20 located inside the case 10, and a cooktop 30 provided at a top end of the oven 1 and on which a container with ingredients therein is placed and heated.

The case 10 may include a front panel 11 which forms a front side of the case 10, a side panel 13 which forms a side of the case 10, and a rear panel 14 which forms a rear side of the case 10.

The cooking compartment 20 may be provided in a box shape inside the case 10 and may have an open front side so ingredients may be placed therein or removed therefrom. An opening 12 provided to correspond to the cooking compartment 20 with the open front side may be provided at the front panel 11.

The open front of the cooking compartment 20 may be opened and closed by a door 40. The door 40 may be hinge-coupled with a bottom of the case 10 to be pivotable with respect to the case 10, and a handle 41 capable of being gripped by a user may be provided at the door 40.

The door 40 may include a transparent portion 42 formed of a transparent material such as glass to allow a process of cooking ingredients inside the cooking compartment 20 to be externally checked.

A plurality of glass members 43 may be provided inside the door 40. The plurality of glass members 43 are for allowing an inside of the cooking compartment 20 to be seen through the transparent portion 42, and may be provided as transparent members other than glass.

A door inlet 44 capable of suctioning air into the door 40 may be provided at a bottom end of the door 40. The door inlet 44 is for cooling heat inside the door 40 by circulating air to prevent heat generated in the cooking compartment 20 from being transferred to an outer surface of the door 40.

Outside air which flows in through the bottom end of the door 40 may be heat exchanged with heat transferred from the cooking compartment 20 while moving toward a top of the door 40 and may be discharged through a door outlet 45 positioned at a front of the door 40.

A storage compartment 50 capable of storing cooking containers, etc. may be provided below the cooking compartment 20. The storage compartment 50 may slide forward and backward to be inserted into or withdrawn from the oven 1.

A plurality of supports 21 may be provided inside the cooking compartment 20. A rack 23 which allows ingredients to be placed thereon may be mounted on the plurality of supports 21. The plurality of supports 21 may be provided to protrude from a left sidewall and a right sidewall of the cooking compartment 20.

A divider (not shown) capable of dividing the cooking compartment 20 may be separably mounted on the plurality of supports 21. In detail, the divider may be horizontally mounted in the cooking compartment 20, and may divide the cooking compartment 20 into a plurality of compartments.

A plurality of such cooking compartments 20 may have the same size and may have different sizes. The divider may include an insulating material and may insulate each of the cooking compartments 20. Through this, spaces of the cooking compartments 20 may be diversely utilized according to the intension of the user.

A heater 22 which heats ingredients may be provided at the cooking compartment 20. In the embodiment, the heater 22 may be an electric heater including an electric resistor. However, unlike the embodiment, the heater 22 may be a gas heater which generates heat by combusting gas. That is, the oven 1 according to the embodiment includes an electric oven and a gas oven.

A circulating fan 25 which circulates air in the cooking compartment 20 to uniformly heat ingredients and a circulating motor 24 which drives the circulating fan 25 may be provided at a rear of the cooking compartment 20. A fan cover 26 which covers the circulating fan 25 may be provided in front of the circulating fan 25, and a through hole 27 is formed at the fan cover 26 to allow the air to flow.

A display module 60 which displays various types of operational information of the oven 1 and allows the user to input an operational command therein may be provided at an upper front of the front panel 11. The display module 60 may be mounted on an electronic device compartment cover 15.

Also, an operation portion 61 provided to additionally operate the oven 1 may be provided at the electronic device compartment cover 15.

The oven 1 includes an electronic device compartment 70 which accommodates electronic devices which control operations of various components including the display module 60. The electronic device compartment 70 is provided on a top of the cooking compartment 20. An insulator 71 which insulates the electronic device compartment 70 from the cooking compartment 20 may be provided between the electronic device compartment 70 and the cooking compartment 20 to prevent heat in the cooking compartment 20 from being transferred to the electronic device compartment 70.

Also, the insulator 71 may be provided to totally cover an outside of the cooking compartment 20 instead of just between the electronic device compartment 70 and the cooking compartment 20 to prevent the heat of the cooking compartment 20 from being transferred outward from the oven 1.

The oven 1 has a cooling structure which cools the electronic device compartment 70 by circulating air around the cooking compartment 20. The cooling structure of the oven 1 may include a cooling fan unit 72 which moves air and a cooling flow channel 73 which discharges air suctioned by the cooling fan unit 72 to the front of the oven 1.

That is, air outside a body may be suctioned into the electronic device compartment 70 through a through hole 14a formed at the rear panel 14, and the air suctioned into the electronic device compartment 70 may flow inside the electronic device compartment 70 to cool the electronic device compartment 70 and then may ultimately be discharged to the front of the oven 1 through an outlet 74 along the cooling flow channel 73.

A part of the air in the cooking compartment 20 may be suctioned into the cooling flow channel 73 through a discharge flow channel 75 and may be discharged to the front of the oven 1. Also, a bypass hole 76 which allows a part of the air which flows to the outlet 74 in the cooling flow channel 73 to flow into the discharge flow channel 75 may be additionally formed. The bypass hole 76 may be opened and closed by an opening and closing apparatus 77. A discharge amount of the air in the cooking compartment 20 that is discharged to the cooling flow channel 73 may be adjusted according to the opening and closing of the bypass hole 76.

Hereinafter, a monitoring unit or assembly 100 (hereinafter, referred to as monitoring unit) which takes the image of the inside of the cooking compartment 20 will be described in detail.

Figure 4:
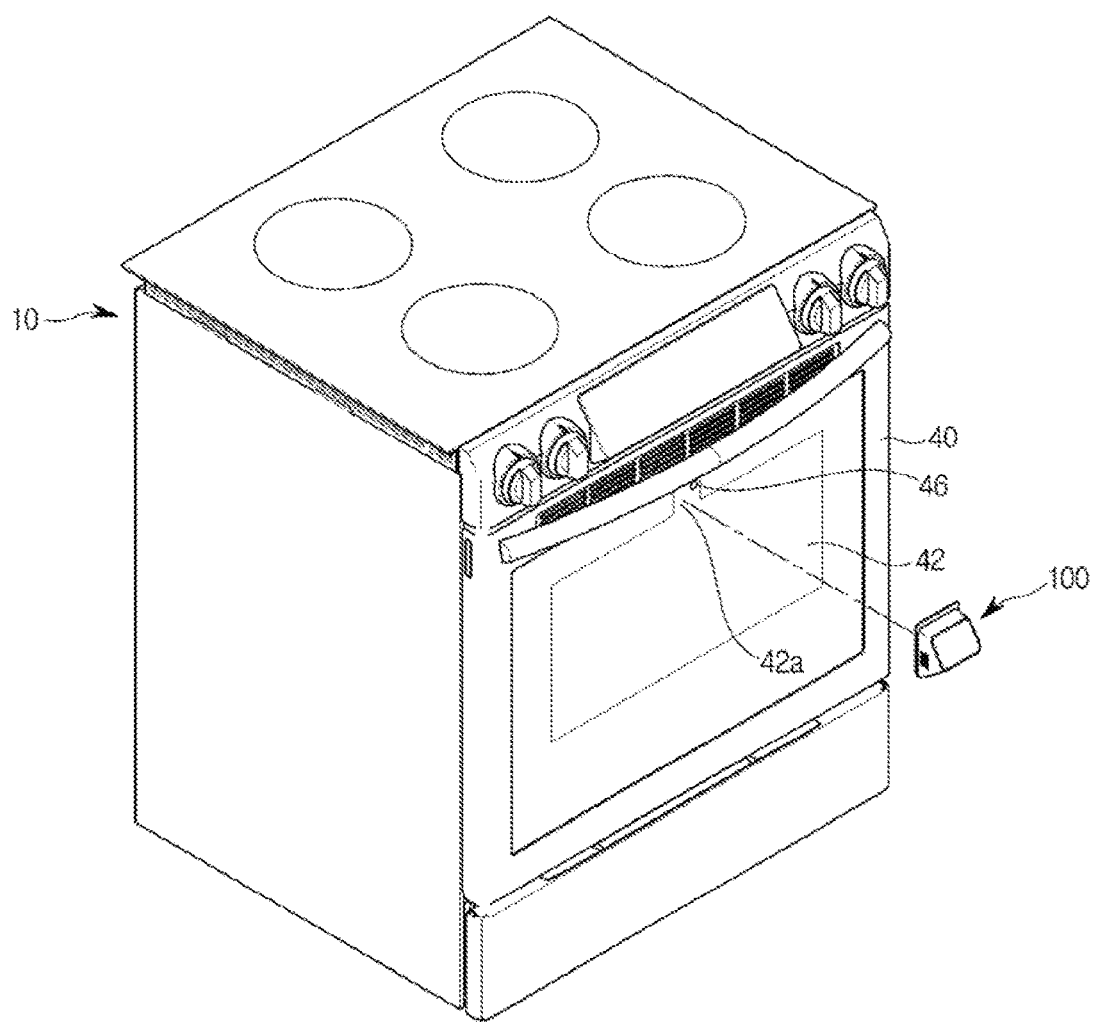
FIG. 4 is an exploded view illustrating a state in which an oven body and a monitoring unit in accordance with one embodiment of the present disclosure are disassembled.
Figure 5:
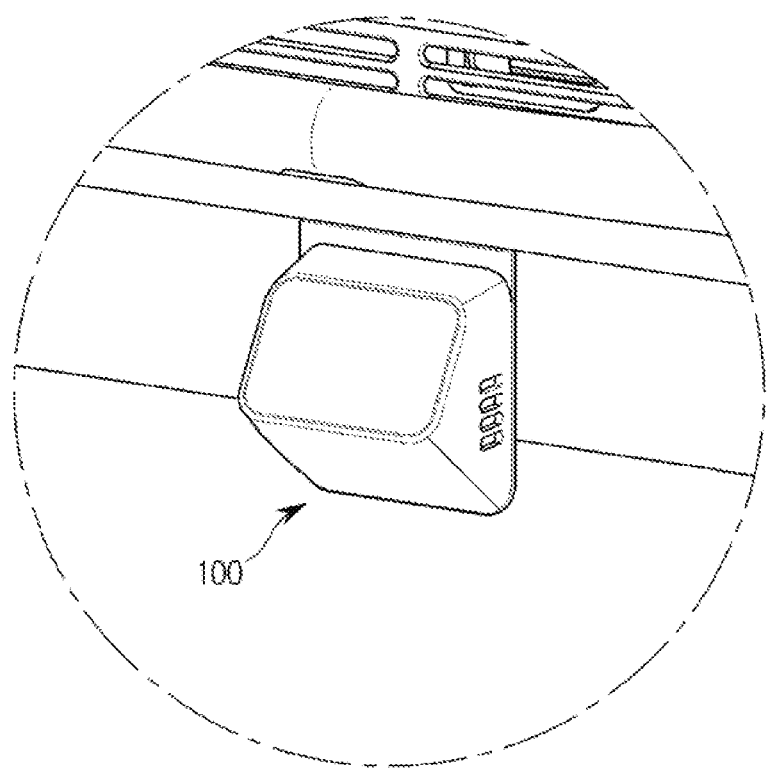
FIG. 5 is an enlarged perspective view of the monitoring unit in accordance with one embodiment of the present disclosure.
Figure 6:
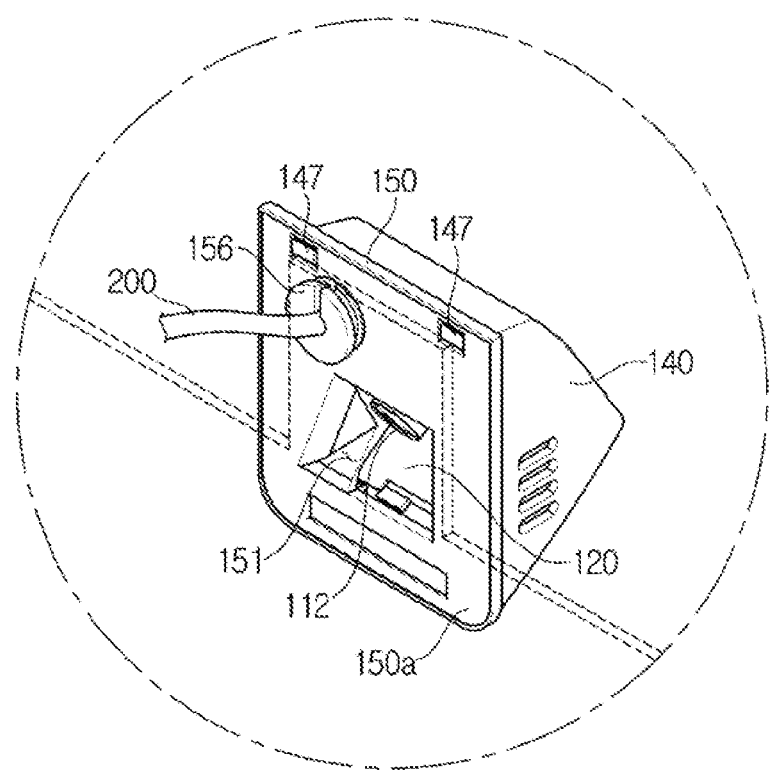
FIG. 6 is an enlarged rear perspective view of the monitoring unit in accordance with one embodiment of the present disclosure.
Figure 7:
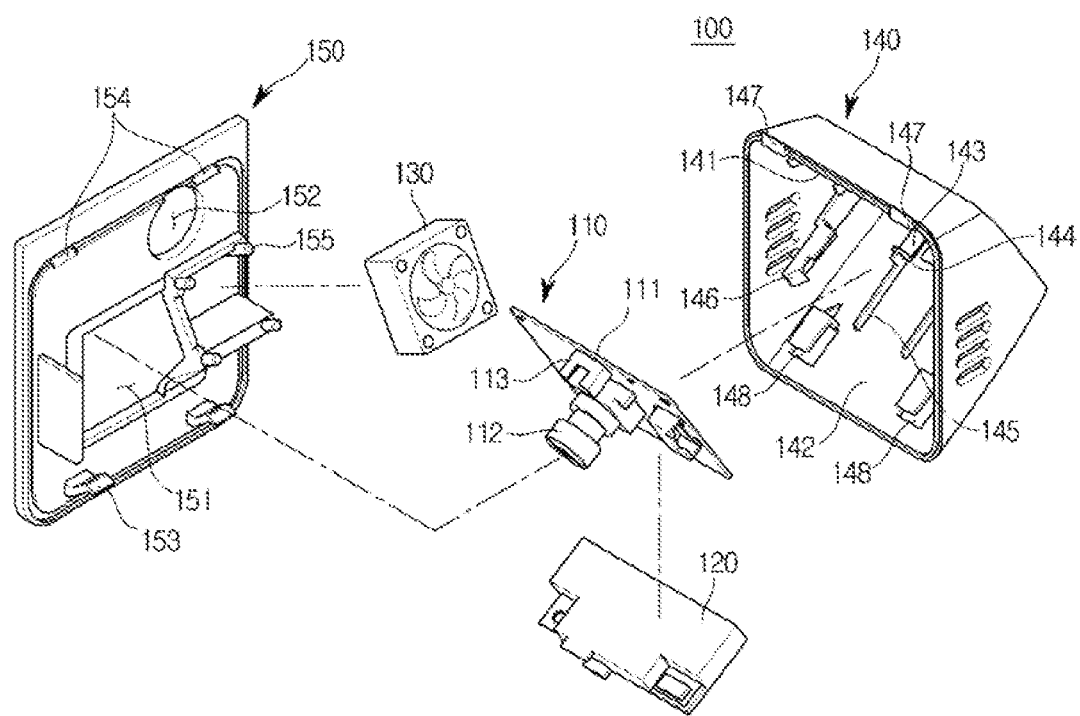
FIG. 7 is an exploded perspective view of the monitoring unit in accordance with one embodiment of the present disclosure.
Figure 8:
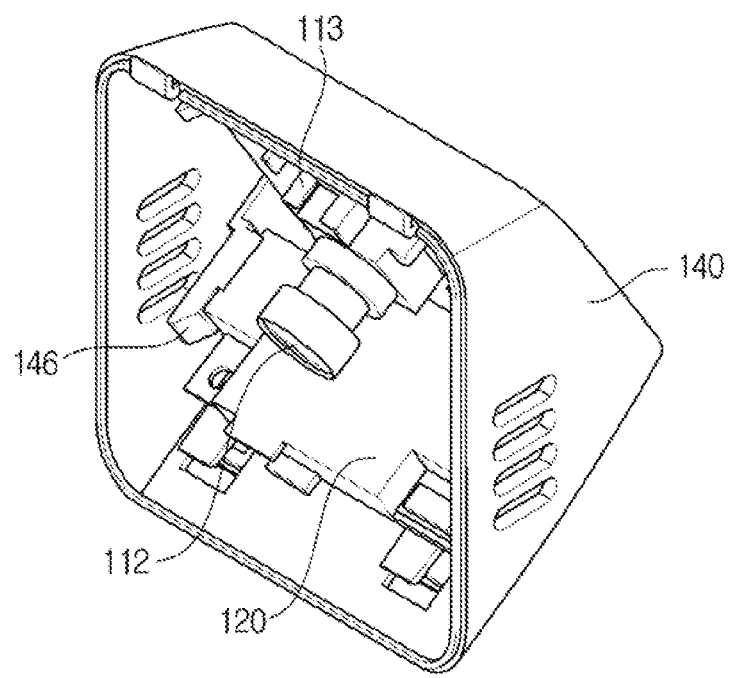
FIG. 8 is a rear perspective view illustrating a state in which a first housing of the monitoring unit in accordance with one embodiment of the present disclosure is removed.
Figure 9:
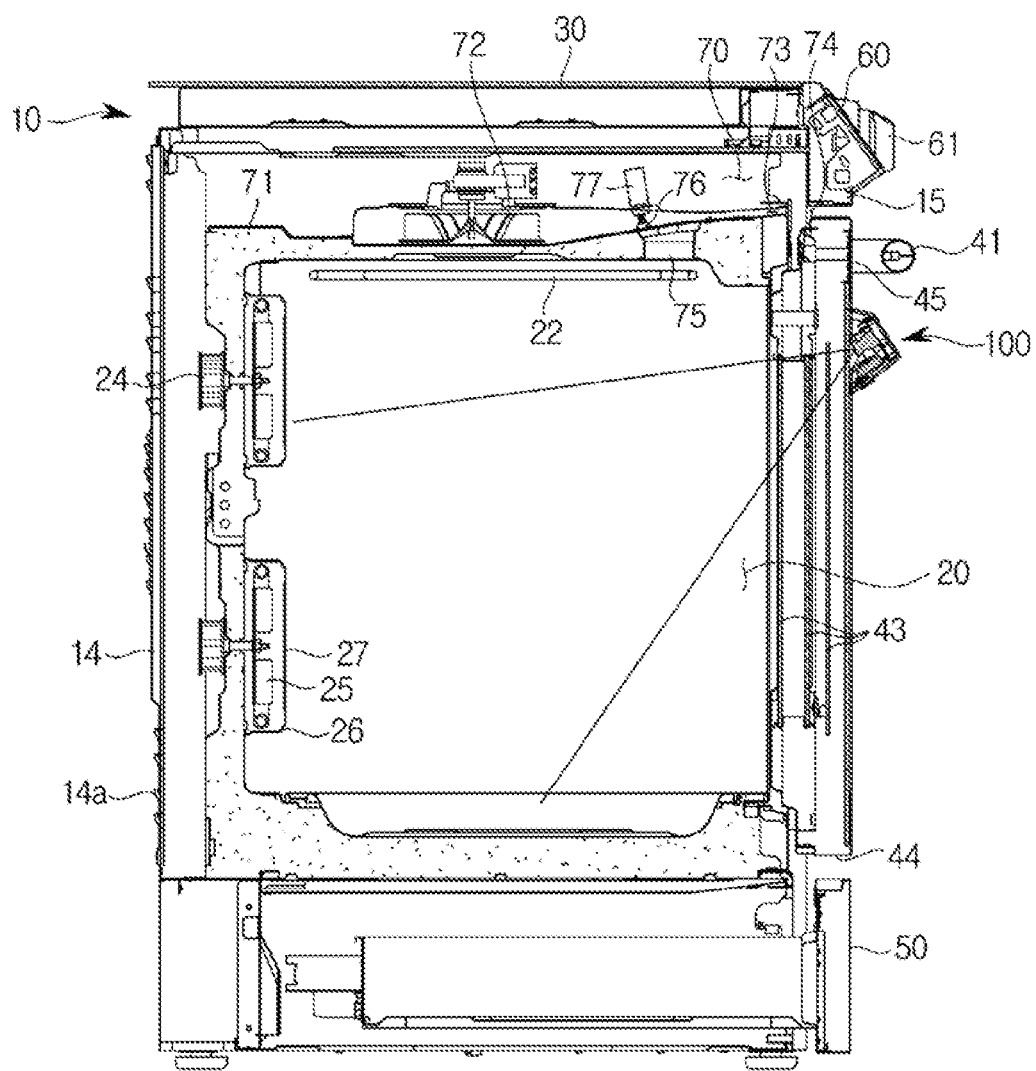
FIG. 9 is a schematic diagram illustrating an image-taking range of the monitoring unit in accordance with one embodiment of the present disclosure.

FIG. 4 is an exploded view illustrating a state in which an oven body and a monitoring unit in accordance with one embodiment of the present disclosure are disassembled. FIG. 5 is an enlarged perspective view of the monitoring unit in accordance with one embodiment of the present disclosure. FIG. 6 is an enlarged rear perspective view of the monitoring unit in accordance with one embodiment of the present disclosure. FIG. 7 is an exploded perspective view of the monitoring unit in accordance with one embodiment of the present disclosure. FIG. 8 is a rear perspective view illustrating a state in which a first housing of the monitoring unit in accordance with one embodiment of the present disclosure is removed. FIG. 9 is a schematic diagram illustrating an image-taking range of the monitoring unit in accordance with one embodiment of the present disclosure.

As shown in FIGS. 4 and 5, the monitoring unit 100 may be disposed on the outer surface of the door 40. In detail, the monitoring unit 100 may be provided on an outer surface of the transparent portion 42 provided at the door 40 and may take the image of the inside of the cooking compartment 20 through the transparent portion 42 from an outside of the door 40.

As described above, the transparent portion 42 may be formed of a transparent material, and the plurality of glass members 43 may be provided at positions inside the door 40 corresponding to the transparent portion 42. Accordingly, since the monitoring unit 100 is located outside the transparent portion 42, the monitoring unit 100 may take the image of the inside of the cooking compartment 20 even though it is not located inside the cooking compartment 20 or inside the door 40.

When the monitoring unit 100 is positioned inside the cooking compartment 20, since the cooking compartment 20 maintains a temperature of about 200° C. during cooking and increases to a temperature of 450° C. during self-cleaning of the cooking compartment 20, it is necessary for the monitoring unit 100 to have high thermal resistance.

Due to this, the monitoring unit 100 is disposed outside the door 40. Since heat transferred to the outside of the door 40 is at a maximum temperature of 65° C., high thermal resistance is not necessary. Accordingly, since an additional component for thermal resistance or a particular thermal resisting method is not necessary, it is efficient from an economical aspect of production.

Unlike one embodiment of the present disclosure, the monitoring unit 100 may be disposed on one side of the case 10 and not on the door 40, and an additional transparent portion 42 (not shown) which allows the inside of the cooking compartment 20 to be seen may be provided at a position at which the monitoring unit 100 is provided.

A corresponding portion 42a may be provided on one side of the transparent portion 42 corresponding to the position at which the monitoring unit 100 is disposed. The corresponding portion 42a is merely provided to correspond to the position at which the monitoring unit 100 is disposed but does not need to be at a particular position.

The monitoring unit 100 may be disposed at a position which allows the image of the entire inside of the cooking compartment 20 to be taken considering a maximal image-taking angle (a maximal view angle of a camera) of a camera module 110 of the monitoring unit 100.

Depending on the maximal image-taking angle of the camera module 110 and a size of the cooking compartment 20, the corresponding portion 42a may not be additionally provided but may be provided on one side of the outer surface of the transparent portion 42.

The monitoring unit 100 may include the camera module 110 which takes the image of the inside of the cooking compartment 20, a communication board 120 which transmits information on the image taken by the camera module 110 to an external device and may receive information from the external device, a cooling fan 130 which cools the camera module 110, and housings 140 and 150 which form an exterior of the monitoring unit 100.

The camera module 110 may include a camera 112 capable of taking images and moving images, a connector 113 connected to a cable 200 to receive power and to transmit and receive electric information, and a camera board 111 on which the camera 112, the connector 113, and other electronic components are mounted.

The camera 112 may observe an internal shape of the cooking compartment 20 through the transparent portion 42.

The camera 112 may have an up-and-down image-taking angle of 60 degrees or less and may have a left and right image-taking angle of 100 degrees or less.

Depending on a maximal image-taking angle of the camera 112, an angle at which the camera module 110 is disposed may be determined. The camera module 110 may be disposed to be inclined with respect to an inner surface of the door 40 to allow the inside of the cooking compartment 20 to be within the maximal image-taking angle.

The camera module 110 may be disposed above the transparent portion 42 to be inclined with respect to the transparent portion 42 at a certain angle.

The communication board 120 may transmit image information or moving image information of the inside of the cooking compartment 20, obtained by the camera module 110, to the external device. The communication board 120 may transmit the obtained information to the external device and may receive information from the external device through various communication methods.

For example, a wireless signal may be transmitted and received through communication methods such as 3-generation (3G), 4-generation (4G), etc. In addition, information may be transmitted and received within a certain distance through communication methods such as wireless local area network (LAN), Wi-Fi, Bluetooth, Zigbee, Wi-Fi Direct (WFD), ultra wideband (UWB), infrared data association (IrDA), Bluetooth low energy (BLE), near field communication (NFC), etc.

The communication board 120 may be provided in the case 10 rather than the monitoring unit 100. Since the case 10 of the oven 1 is generally formed of a member including steel to provide thermal resistance, when the communication board 120 is provided inside the member including steel, there may be a limitation in communication. Accordingly, the communication board 120 may be provided at the monitoring unit 100 provided outside the case 10.

Transmission and reception of information of the communication board 120 will be described in detail.

The cooling fan 130 which cools the camera module 110 may be provided on one side of the camera module 110. Since the monitoring unit 100 may be provided to be in contact with the door 40 to which a part of heat of the cooking compartment 20 is transferred, the monitoring unit 100 may be at room temperature or higher.

The cooling fan 130 cools heat generated by the camera module 110 and a temperature higher than room temperature (about 65° C.) generated outside the monitoring unit 100 to allow the camera module 110 to be stably operated.

The housings 140 and 150 that form the exterior of the monitoring unit 100 may include a first housing 140 in which the camera module 110 and the communication board 120 are mounted and a second housing 150 in contact with the outer surface of the door 40.

The first housing 140 may include a space with an opening on one side to allow the camera module 110 and the communication board 120 to be mounted therein. In detail, the first housing 140 may include a first mounting portion 141 into which the camera module 110 is mounted and a second mounting portion 142 in which the communication board 120 is mounted.

Since the camera module 110 is disposed with a certain inclination with respect to the door 40 as described above, the first mounting portion 141 may be provided to be inclined to correspond with the incline of the camera module 110.

One side of the first mounting portion 141 adjacent to the second mounting portion 142 may include a first supporting protrusion 143 which protrudes from the second mounting portion 142 to the first mounting portion 141 to come into contact with a bottom of the camera module 110 to allow the camera module 110 to be supported by the first mounting portion 141 in parallel, and a first fixing hook 144 which fixes the camera module 110 mounted on the first supporting protrusion 143.

Although not shown in FIG. 7, components similar to the first supporting protrusion 143 and the first fixing hook 144 may be provided at a top of the first mounting portion 141 and may support a top of the camera module 110.

The second mounting portion 142 may include a second supporting protrusion 145 which protrudes upward from the second mounting portion 142 to support a bottom of the communication board 120. Also, a second fixing hook 146 which protrudes inward from a pair of side portions of the first housing 140 may be provided to fix the communication board 120 supported by the second supporting protrusion 145.

The first and second supporting protrusions 143 and 145 and the first and second fixing hooks 144 and 146 are not limited to one embodiment of the present disclosure and may be provided in various shapes to allow the camera module 110 and the communication board 120 to be mounted in the first housing 140.

The communication board 120 may be provided to be maximally adjacent to the second mounting portion 142. In detail, another component may not be provided in the first housing 140 in which the communication board 120 and the second mounting portion 142 are provided.

This is to prevent communication of transmitting and receiving information between the communication board 120 and the external device from being interrupted. Due to the reason described above, even though parts of the monitoring unit 100 are disposed inside the door 40 or the case 10 unlike one embodiment of the present disclosure, the communication board 120 may be disposed outside the door 40 or the case 10.

A first coupling hook 147 provided to be coupled with the second housing 150 may be provided above the opening of the first housing 140. The first coupling hook 147 may be provided to correspond to a first coupling groove 154 provided at the second housing 150 and may be inserted into and coupled with the first coupling groove 154 when the first housing 140 and the second housing 150 come into contact with each other to correspond to each other.

Also, a second coupling groove 148 provided to be coupled with the second housing 150 may be provided below the opening of the first housing 140. The second coupling groove 148 may be provided to correspond to a second coupling hook 153 provided at the second housing 150.

The first and second coupling hooks 147 and 153 and the first and second coupling grooves 154 and 148 are not limited to one embodiment of the present disclosure and may be formed upside down.

The second housing 150 as described above may be provided separably with the first housing 140 and may be coupled with the door 40.

The second housing 150 is provided in a plate shape and includes an installation surface 150a on a side facing the door 40. The installation surface 150a may be provided to be parallel to the door 40, may be attached to the outer surface of the door 40 using an adhesive, and may be coupled with the outer surface of the door 40 using an additional installation member, for example, coupling by a screw and coupling by a hook.

The second housing 150 may include an opening 151 opened to allow the camera module 110 mounted in the first housing 140 to take the image of the inside of the cooking compartment 20 through the second housing 150.

A size of the opening 151 may be determined considering an installation angle of the camera module 110 and the image-taking angle of the camera 112.

A cable through hole 152 through which the cable 200 connecting the camera module 110 with a micom 300, which will be described below, is connected to an inside of the monitoring unit 100 may be provided on one side of the second housing 150.

The cable through hole 152 may be provided at a position corresponding to a door through hole 46 provided to allow the cable 200 to pass through from the inside of the door 40 to the outside thereof (refer to FIG. 4). The cable 200 may be connected from the micom 300, through the inside of the door 40, the door through hole 46, and the cable through hole 152, and to the inside of the monitoring unit 100.

A sealing member 156 may be provided inside the cable through hole 152. The sealing member 156 is provided to prevent heat generated by the door 40 from being transferred to the monitoring unit 100 by sealing a gap between the cable through hole 152 and the cable 200.

A cooling fan supporting protrusion 155 may be provided on one side of the second housing which faces the first housing 140 to dispose the cooling fan 130 thereon.

To provide the cooling fan 130 to be adjacent to the camera module 110 and to be parallel to the camera module 110 to increase cooling efficiency, the cooling fan supporting protrusion 155 may protrude toward the first housing 140 with a certain inclination with respect to the second housing 150 to dispose the cooling fan 130 with the same inclination as that of the camera module 110.

In an order of installing the monitoring unit 100, first, the monitoring unit 100 is positioned at a position (the corresponding portion 42a) corresponding to the door through hole 46 and the cable through hole 152 and is attached to allow the installation surface 150a to come into contact with the door 40.

After that, the first housing 140 in which the camera module 110 and the communication board 120 are mounted is positioned to correspond to the second housing 150 and pressurized toward the second housing 150 to be hooked thereto.

The housings 140 and 150 may be provided to be separated by being pressurized in an opposite direction to replace the components provided inside the housings 140 and 150 after the housings 140 and 150 are coupled. That is, the second housing 150 may be pressurized in the opposite direction to be detached from the first housing 140.

Also, an opening (not shown) with a certain size may be provided on one side of the first housing 140 to allow an internal component to be replaced through the opening without separating the first housing 140 from the second housing 150. Here, the opening may be provided to be closed by an additional packing member (not shown) and to be open only when the internal component is replaced.

To prevent the limitation in communication of the communication board 120 described above, the housings 140 and 150 may be formed of a material including a plastic resin, etc.

Figure 10:
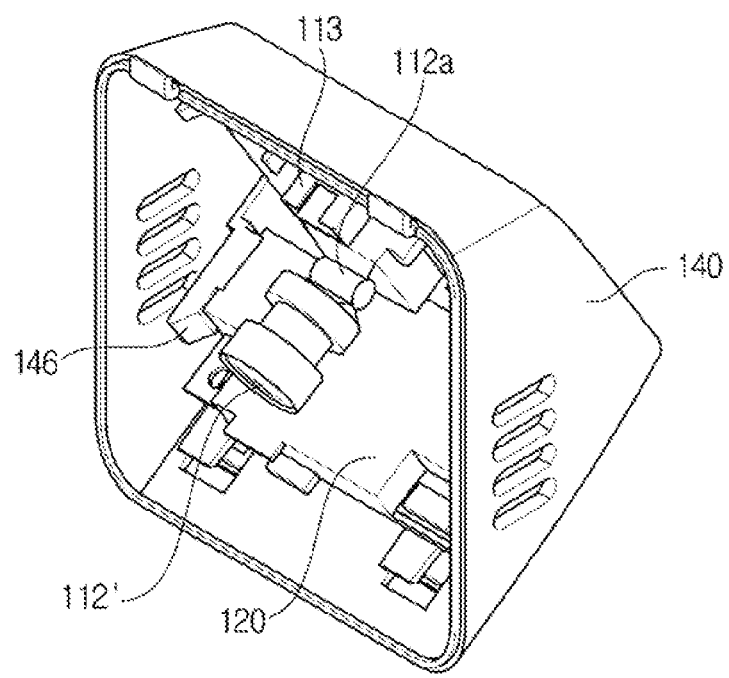
FIG. 10 is a rear perspective view illustrating a state in which a first housing of a monitoring unit in accordance with another embodiment of the present disclosure is removed.

FIG. 10 is a rear perspective view illustrating a state in which a first housing of a monitoring unit in accordance with another embodiment of the present disclosure is removed.

Hereinafter, components other than additionally described components are identical to those of the oven 1 described above.

A camera 112' may be provided to be pivotable by a pivoting member 112a.

The pivoting member 112a is provided between the camera 112' and the camera board 111 to allow the camera 112' to pivot due to pivoting of the pivoting member 112a. The pivoting member 112a may be provided as a hinge structure to allow the camera 112' to tilt up and down and left and right or may be provided as a ball structure to allow the camera 112' to freely pivot.

Since the camera 112' may pivot, a range of which images may be taken by the camera 112' may increase. Also, since the camera 112' pivots according to a height of the rack 23 on which ingredients are disposed, clear image information satisfying the need of the user may be obtained.

Hereinafter, the cable 200 which electrically connects the micom 300 with the monitoring unit 100 will be described in detail.

Figure 11:
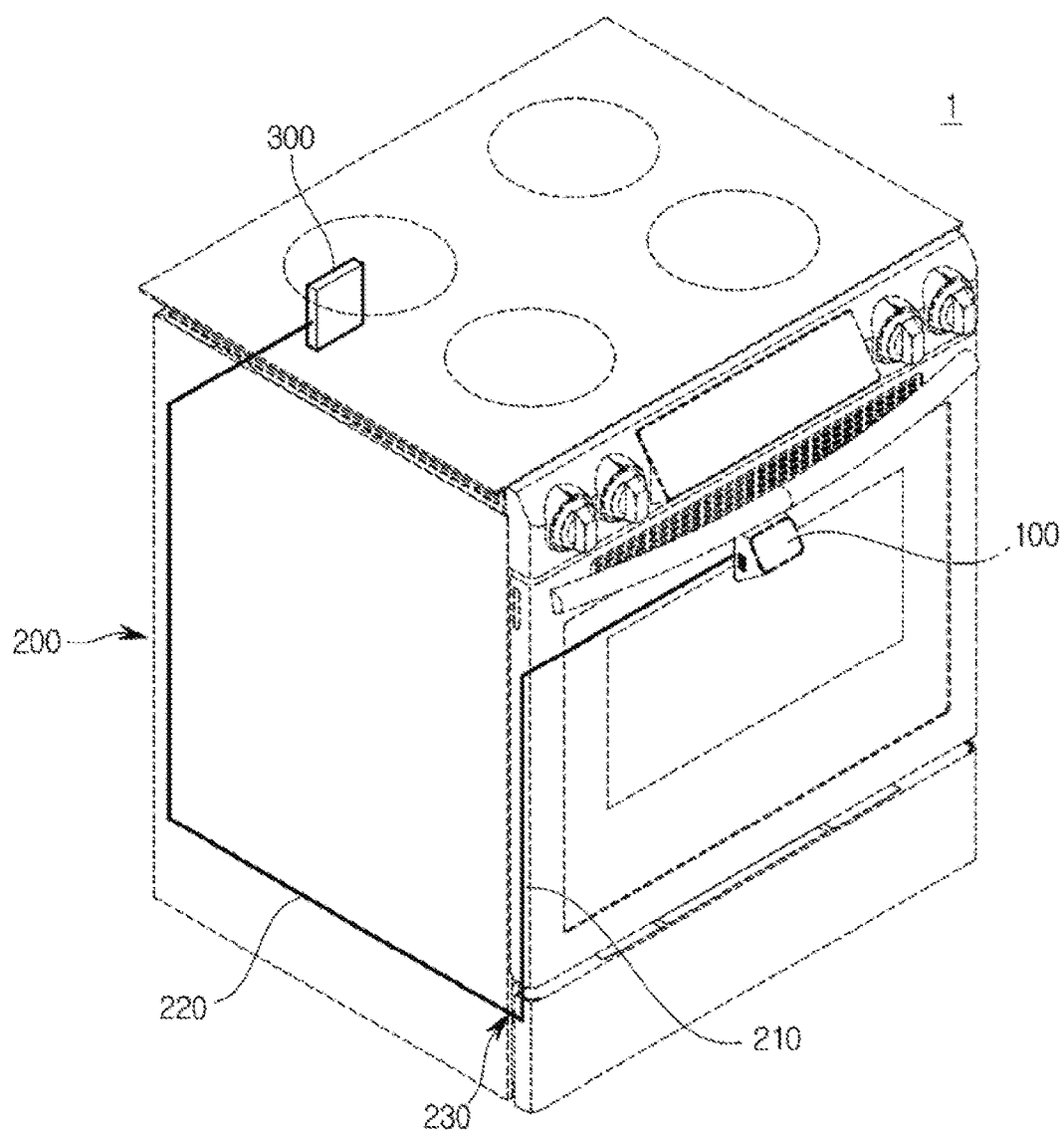
FIG. 11 is a perspective view illustrating a total disposition of a cable in accordance with one embodiment of the present disclosure.
Figure 12:
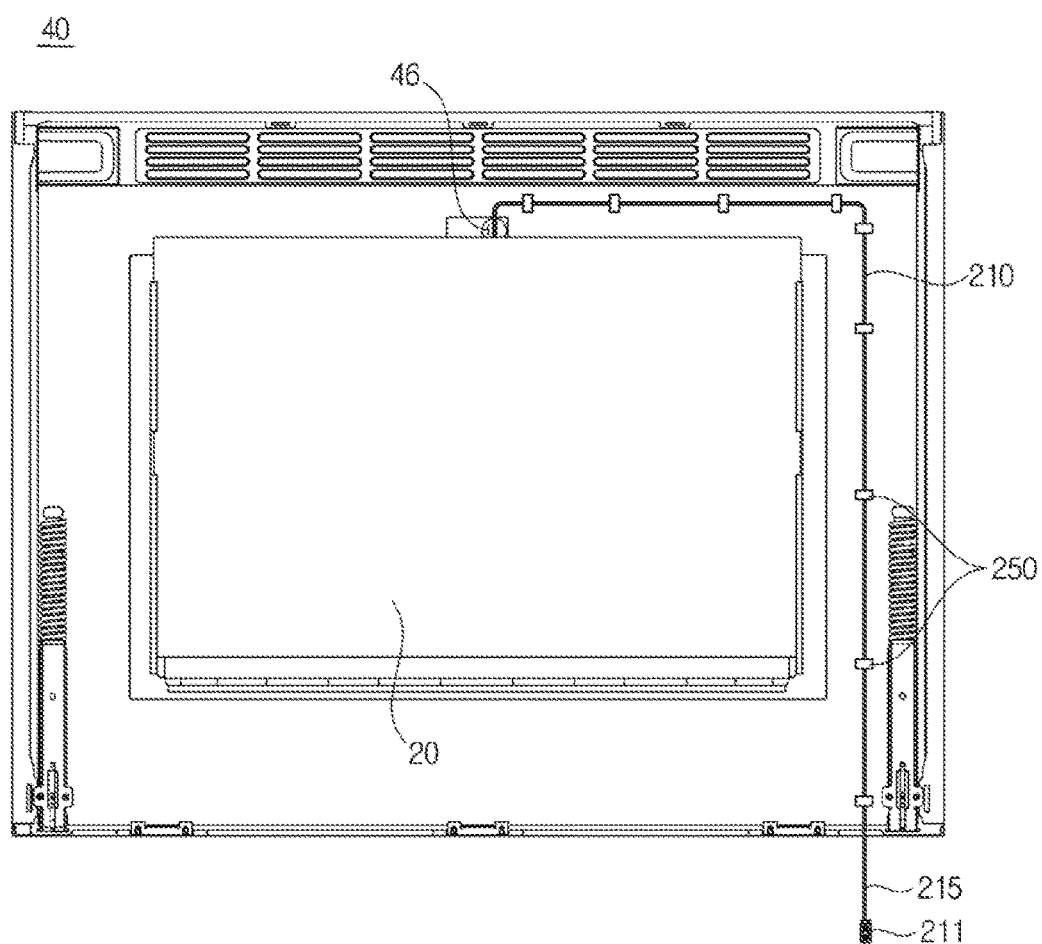
FIG. 12 is a view illustrating a state in which the cable is disposed on a side of a case while a side panel is removed in accordance with one embodiment of the present disclosure.
Figure 13:
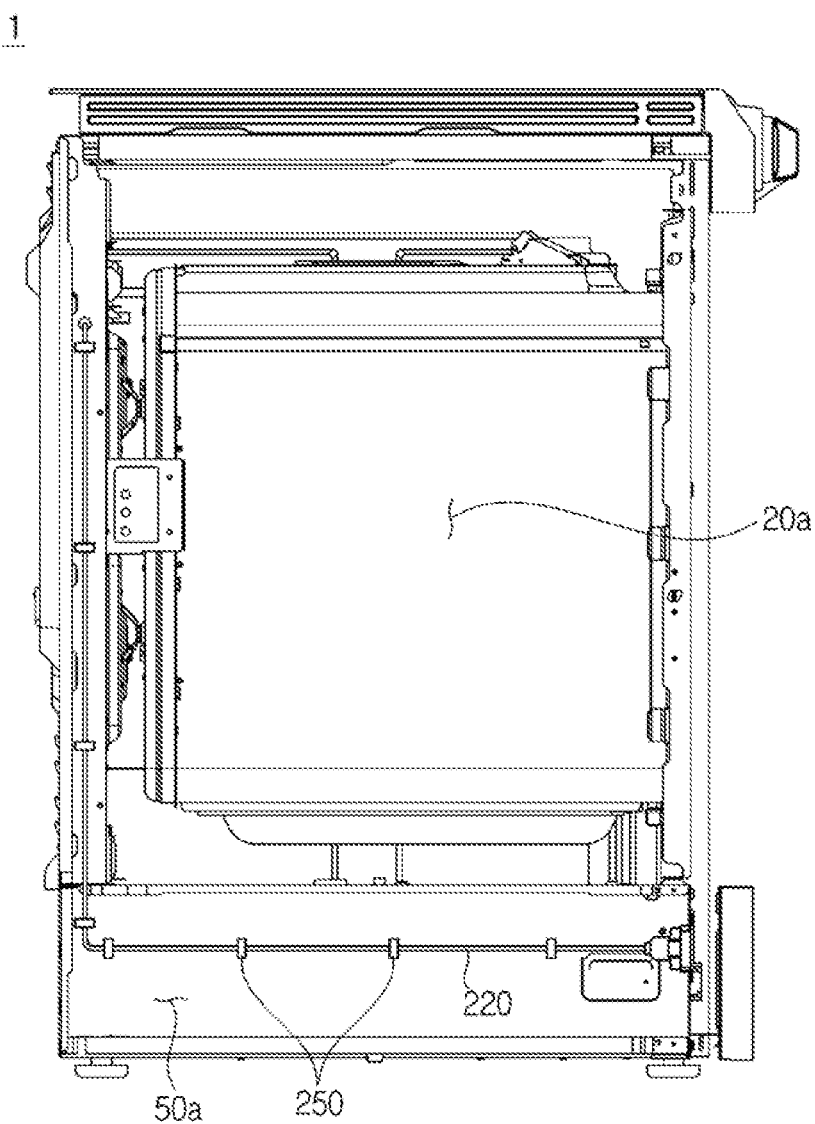
FIG. 13 is a view illustrating a state in which the cable in accordance with one embodiment of the present disclosure is disposed inside the door.
Figure 14:
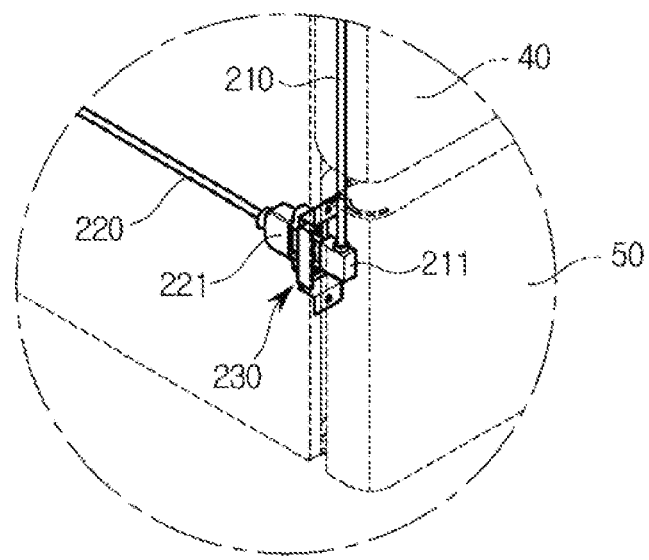
FIG. 14 is an enlarged view illustrating a separation section of the cable in accordance with one embodiment of the present disclosure.
Figure 15:
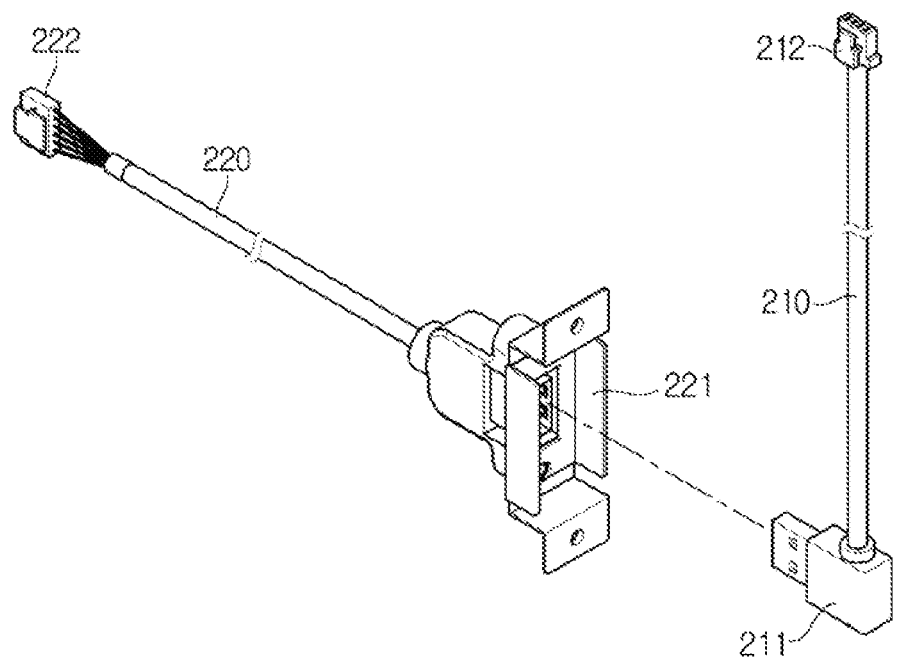
FIG. 15 is a perspective view of the cable in accordance with one embodiment of the present disclosure.
Figure 16:
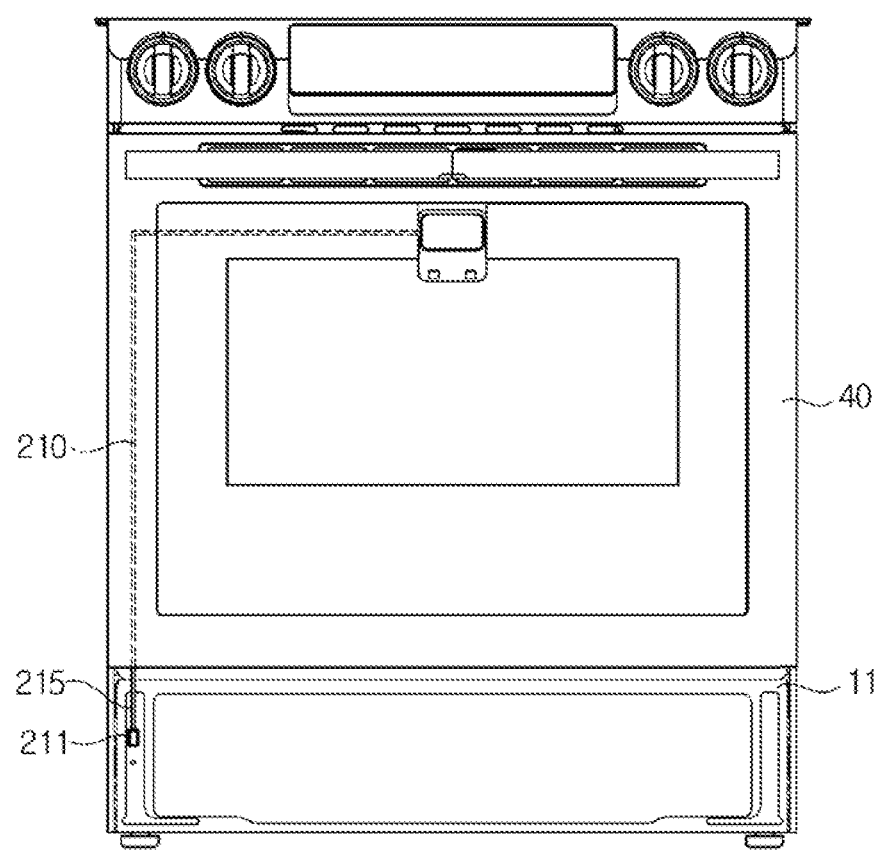
FIG. 16 is a front view illustrating a state in which a storage compartment in accordance with one embodiment of the present disclosure is removed.
Figure 17:
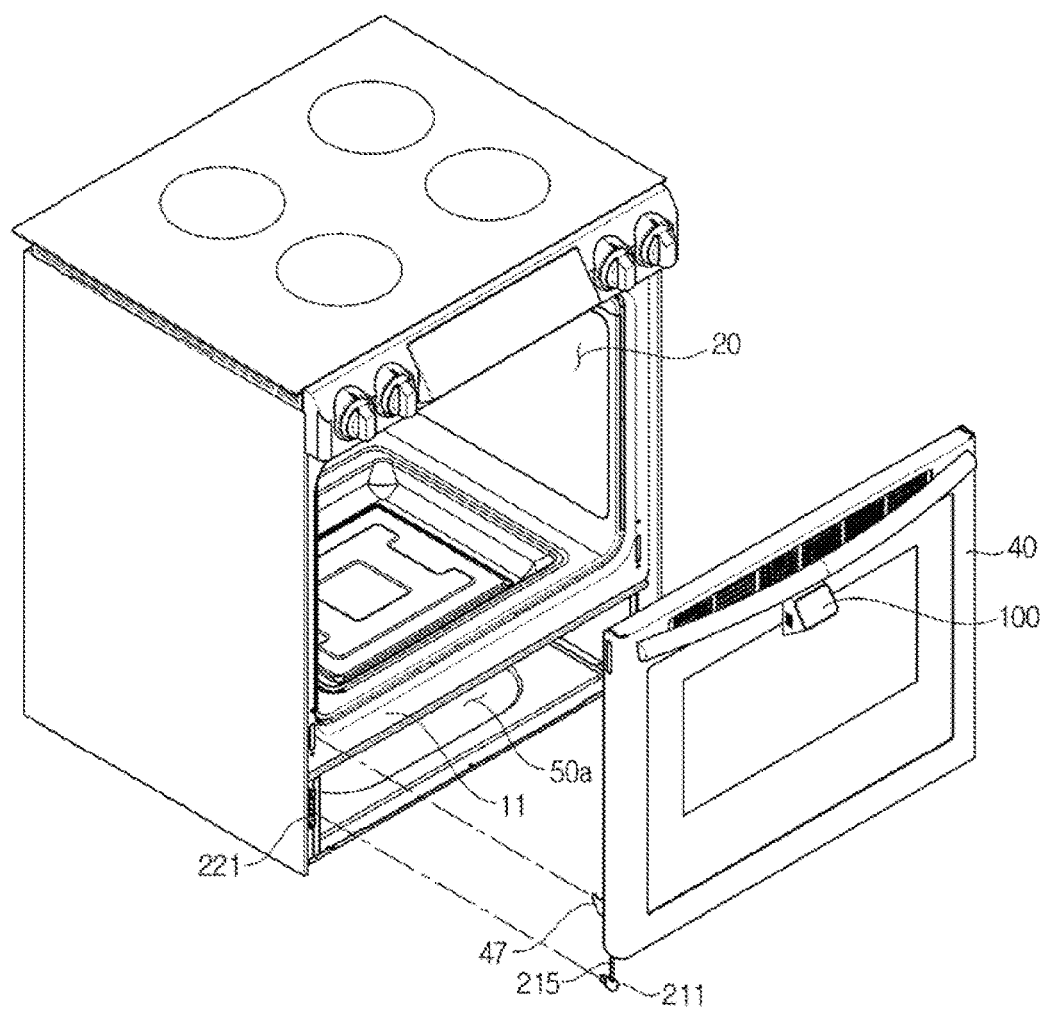
FIG. 17 is a view illustrating a state in which the door is separated from the case while the storage compartment in accordance with one embodiment of the present disclosure is removed.

FIG. 11 is a perspective view illustrating a total disposition of the cable in accordance with one embodiment of the present disclosure. FIG. 12 is a view illustrating a state in which the cable is disposed on a side of the case while the side panel is removed in accordance with one embodiment of the present disclosure. FIG. 13 is a view illustrating a state in which the cable is disposed inside the door in accordance with one embodiment of the present disclosure. FIG. 14 is an enlarged view illustrating a separation section of the cable in accordance with one embodiment of the present disclosure. FIG. 15 is a perspective view of the cable in accordance with one embodiment of the present disclosure. FIG. 16 is a front view illustrating a state in which a storage compartment in accordance with one embodiment of the present disclosure is removed. FIG. 17 is a view illustrating a state in which the door is separated from the case while the storage compartment in accordance with one embodiment of the present disclosure is removed.

The oven 1 may include the micom 300 which controls the monitoring unit 100.

The micom 300 may be provided as a component which independently controls only the monitoring unit 100, or may be a component which controls total operation of the oven 1 and additionally controls the monitoring unit 100. Hereinafter, the micom 300 will be described as controlling the monitoring unit 100 and the oven 1.

Also, the micom 300 is defined as a component totally including a micro computer formed of a chip and various types of electronic components for driving the micro computer such as a substrate on which the micro computer is mounted and a power supply mounted on the substrate, etc.

The cable 200 may be connected between the micom 300 and the monitoring unit 100. The cable 200 may electrically connect the micom 300 with the monitoring unit 100.

The cable 200 may supply power to the monitoring unit 100 and may transmit and receive information between the micom 300 and the monitoring unit 100.

The micom 300 may be provided inside the rear panel 14 of the oven 1. Accordingly, the cable 200 passes through an inside of the rear panel 14 to an inside of the side panel 13.

In detail, as shown in FIG. 12, the cable 200 connected from the micom 300 is bent from the inside of the rear panel 14 toward the inside of the side panel 13 and is bent again toward the front of the oven 1 at a height corresponding to the storage compartment 50 to be disposed to face the front panel 11.

In the side panel 13, the cable 200 may be disposed to pass between a space in which the insulator 71 is provided and a space in which the side panel 13 is provided, that is, through a gap 20*a* between an outermost portion of the cooking compartment 20 including the insulator 71 and the side panel 13 and a gap 50*a* between the storage compartment 50 and the side panel 13. This is to facilitate replacement of the cable 200 when the cable 200 fails.

In a section in which the cable 200 extends from the micom 300 to the front panel 11, the cable 200 may be fixed by a plurality of fixing members 250 provided to be fixed and supported by a random component of the oven 1 provided inside the case 10.

The fixing members 250 may include supporting holes provided to allow the cable 200 to pass therethrough and be supported. The supporting holes may be provided with a diameter larger than a diameter of the cable 200 to allow the cable 200 to move within a gap between the cable 200 and the supporting holes.

The fixing members 250 may be variably attached to any component of the oven 1 to support the cable 200.

The cable 200 disposed in the inside of the side panel 13 does not extend to an inside of the front panel 11 and passes through the front panel 11 to extend to the inside of the door 40 and be connected to the monitoring unit 100. This is to facilitate separation of the cable 200 when the door 40 is separated from the oven 1.

In the cable 200, when a section of the cable 200 connected to the monitoring unit 100 and disposed inside the door 40 is referred to as a first cable 210 and a section of the cable 200 extending from the first cable 210, which is connected to the micom 300, and disposed in the case 10 is referred to as a second cable 220, a separation section 230 may be provided between the first cable 210 and the second cable 220 to separate the cable 200.

One side of the first cable 210 may be connected to the monitoring unit 100. In detail, the first cable 210 may be disposed in the door 40 and may extend into the monitoring unit 100 through the door through hole 46 positioned on the outer surface of the door 40.

The first cable 210 may be connected to the connector 113 of the camera module 110 through the cable through hole 152 of the monitoring unit 100.

As shown in FIG. 13, the first cable 210 may be disposed in the door 40, which does not correspond to the transparent portion 42 for aesthetic reasons. Accordingly, the first cable 210 extending from the door through hole 46 may horizontally extend and may be bent at a side portion of the door 40 to extend downward.

The first cable 210 may be disposed and fixed to the inside of the door 40 by the fixing members 250 described above.

The other side of the first cable 210 extending to a bottom of the door 40 may include an exposed portion 215 provided to pass through a bottom surface of the door 40 to be exposed outside the door 40. One end of the exposed portion 215, that is, the other side of the first cable 210, may be connected to the second cable 220 positioned at the front panel 11.

One side of the second cable 200 may be connected to the micom 300 provided at the rear panel 14. The second cable 220, as described above, extends from the micom 300 to the rear panel 14 and then inside of the side panel 13.

The other side of the second cable 220 may be disposed at the front panel 11 to be connected to the first cable 210. In detail, another end of the second cable 220 may pass through from a rear of the front panel 11 to a front of the front panel 11 and the other end of the second cable 220 may be positioned at the front panel 11.

The separation section 230 may be provided between the first cable 210 and the second cable 220. In detail, the separation section 230 may be provided on the front panel 11 where the first cable 210 and the second cable 220 are connected and may be positioned below the door 40.

The first cable 210 and the second cable 220 may be separated at the separation section 230. In detail, by providing a first coupling portion 211 to be coupled with the second cable 220 on the other side of the first cable 210 and a second coupling portion 221 to be coupled with the first coupling portion 211 of the first cable 210 on the one side of the second cable 220, the first cable 210 and the second cable 220 may be coupled to each other.

By providing the first coupling portion 211 in a universal serial bus (USB) connector shape and the second coupling portion 221 in a USB port shape, the first coupling portion 211 may be inserted into the second coupling portion 221 and be coupled.

The second coupling portion 221 may be coupled with the front panel 11 using a screw and the first coupling portion 211 may be accordingly inserted into the front panel 11 in such a way as to allow the cable 200 to be coupled and separated.

Since the separation section 230 is provided to correspond to the one end of the exposed portion 215, the separation section 230 may be provided on one side at a height of the storage compartment 50.

Accordingly, the separation section 230 is not exposed outside the oven 1 by a front portion of the storage compartment 50 when the storage compartment 50 is closed and is exposed to the outside when the storage compartment 50 is slid opened.

Here, the user may easily pressurize a space between the first cable 210 and the second cable 220 to separate the cable 200.

The user may separate the door 40 from the case 10 to clean the door 40 as necessary. When the door 40 is separated from the case 10, the first cable 210 and the second cable 220 are separated at the separation section 230, thereby separating the cable 200 with the door 40 from the case 10.

Since the monitoring unit 100 is provided on the door 40, when the door 40 is separated, the monitoring unit 100 may also be separated from the case 10. Here, since the monitoring unit 100 is connected to the micom 300 through the cable 200, when the cable 200 is not separated, even through the door 40 is separated, the door 40 may not be completely separated from the case 10 due to a part of the cable 200 provided to extend in the case 10.

Accordingly, the separation section 230 allows the user to completely separate the door 40 from the case 10.

A first connection portion 212 connected to the connector 113 of the monitoring unit 100 is provided on the one side of the first cable 210 to allow the first cable 210 and the monitoring unit 100 to be electrically connected.

A second connection portion 222 connected to the micom 300 is provided on the other side of the second cable 220 to allow the second cable 220 and the micom 300 to be electrically connected.

In detail, as described above, the first coupling portion 211 provided on the other side of the first cable 210 is coupled with the second coupling portion 221 of the second cable 220, thereby electrically connecting the micom 300 and the monitoring unit 100.

Hereinafter, a process through which the door 40 is separated from the case 10 and accordingly the cable is separated will be described.

Before separating the door 40, the separation section 230 of the cable 200 should be proactively opened by sliding the storage compartment 50 open. When the storage compartment 50 is closed, it is difficult for the user to approach the separation section 230, and thus it is impossible to separate the cable 200. Accordingly, since a state in which the cable 200 is connected to the inside of the case 10 is maintained, it is impossible to completely separate the door 40 from the case 10.

As shown in FIGS. 15 and 16, when the storage compartment 50 is opened, the exposed portion 215 of the cable 200 and the separation section 230 positioned above the exposed portion 215 may be exposed below the door 40.

The user may separate the first coupling portion 211 from the second coupling portion 221 by pulling the exposed portion 215 or the first coupling portion 211 provided at the separation section 230 in front of the oven 1. The cable 200 may be separated after the door 40 is separated first.

Unlike one embodiment of the present disclosure, when the monitoring unit 100 is provided on one side in the case 10 and not the door 40, the monitoring unit 100 is not separated according to the separation of the door 40. Accordingly, the separation section 230 may not be additionally provided. Also, when the door 40 is separated, it is unnecessary to additionally separate the cable 200 and it is possible to separate only the door 40.

The door 40 may be provided to be pivotable with respect to the case 10 by a hinge portion 47. When the user pressurizes the handle 41 of the door 40 downward with the hinge portion 47 as a pivoting shaft, the door 40 may pivot downward to open the storage compartment 20.

Differently, when the user pressurizes the door 40 forward, the hinge portion 47 is separated from the case 10, thereby separating the door 40 from the case 10. Accordingly, after the cable 200 is separated, the door 40 may be completely separated from the case 10 by pressurizing the door 40 forward.

After cleaning of the door 40, the door 40 may be assembled with the case 10 using the same method. That is, after the door 40 is pressurized toward the front panel 11 and the hinge portion 47 is mounted on the front panel 11, the first coupling portion 211 is pressurized toward the second coupling portion 221, thereby connecting the cable 200. Finally, the storage compartment 50 is slid to insert the storage compartment 50 into a storage compartment withdrawal space.

As described above, since the cable 200 connecting the door 40 and the case 10 is separably provided, an effect of simplifying a process of manufacturing the oven 1 may be provided.

That is, during to the process of manufacturing the oven 1, the door 40 and the case 10 are each preliminarily assembled through an assembly process and then a process through which the door 40 and the case 10 are assembled with each other may be performed, thereby facilitating the manufacture of the oven 1 and efficiently increasing productivity.

Hereinafter, a connection structure of the cable 200 in accordance with another embodiment of the present disclosure will be described. Since components of an oven 1a other than components to be described hereafter are identical to those in accordance with one embodiment of the present disclosure described above, a repetitive description thereof will be omitted.

Figure 18:
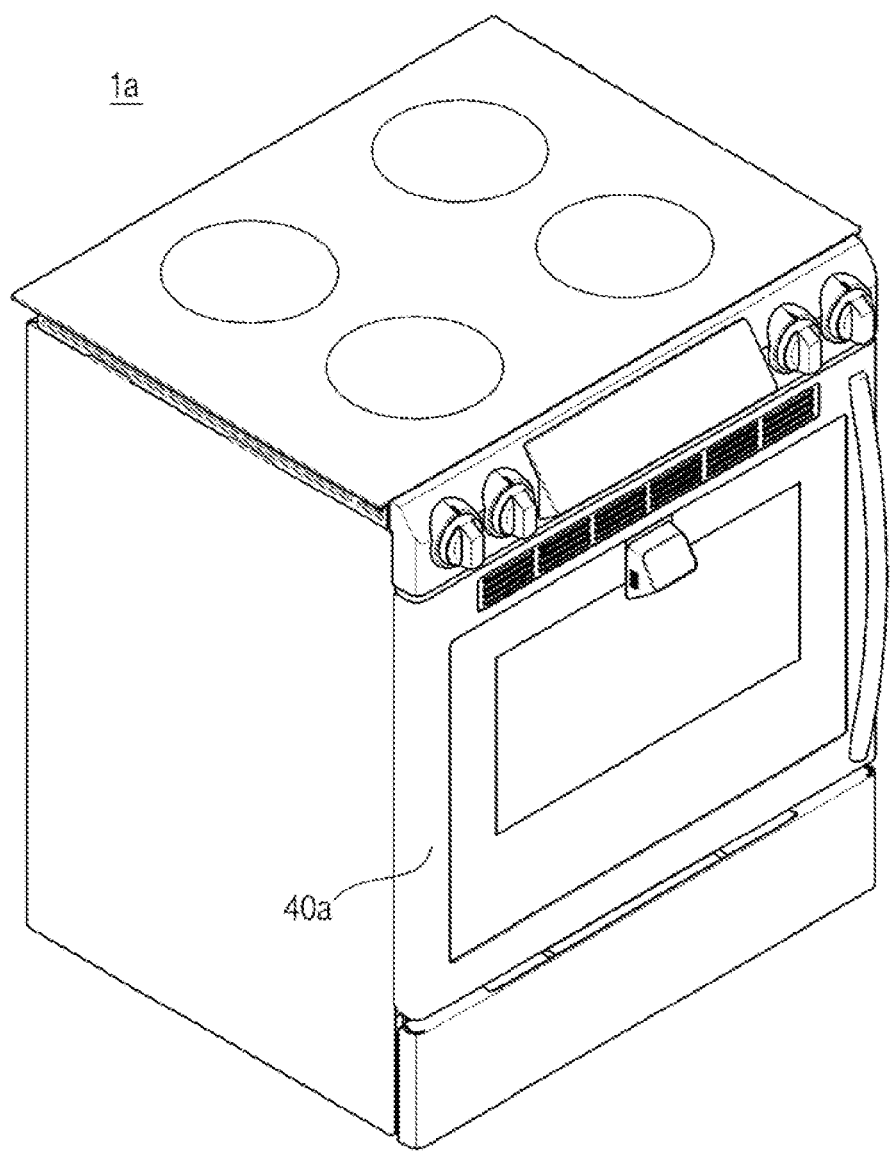
FIG. 18 is a perspective view of an oven in accordance with another embodiment of the present disclosure.
Figure 19:
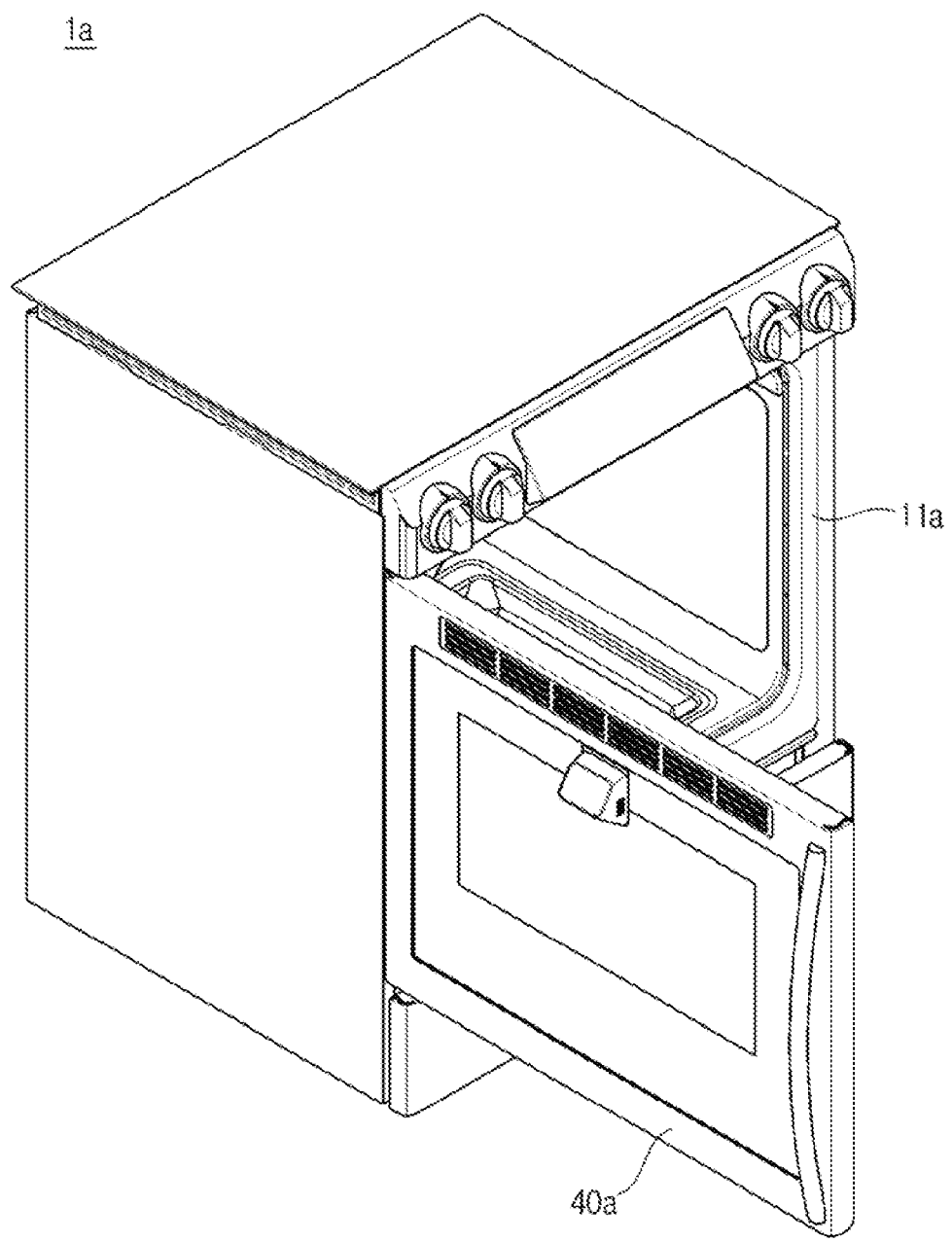
FIG. 19 is a view illustrating a state in which a door of the oven in accordance with another embodiment of the present disclosure is opened.
Figure 20:
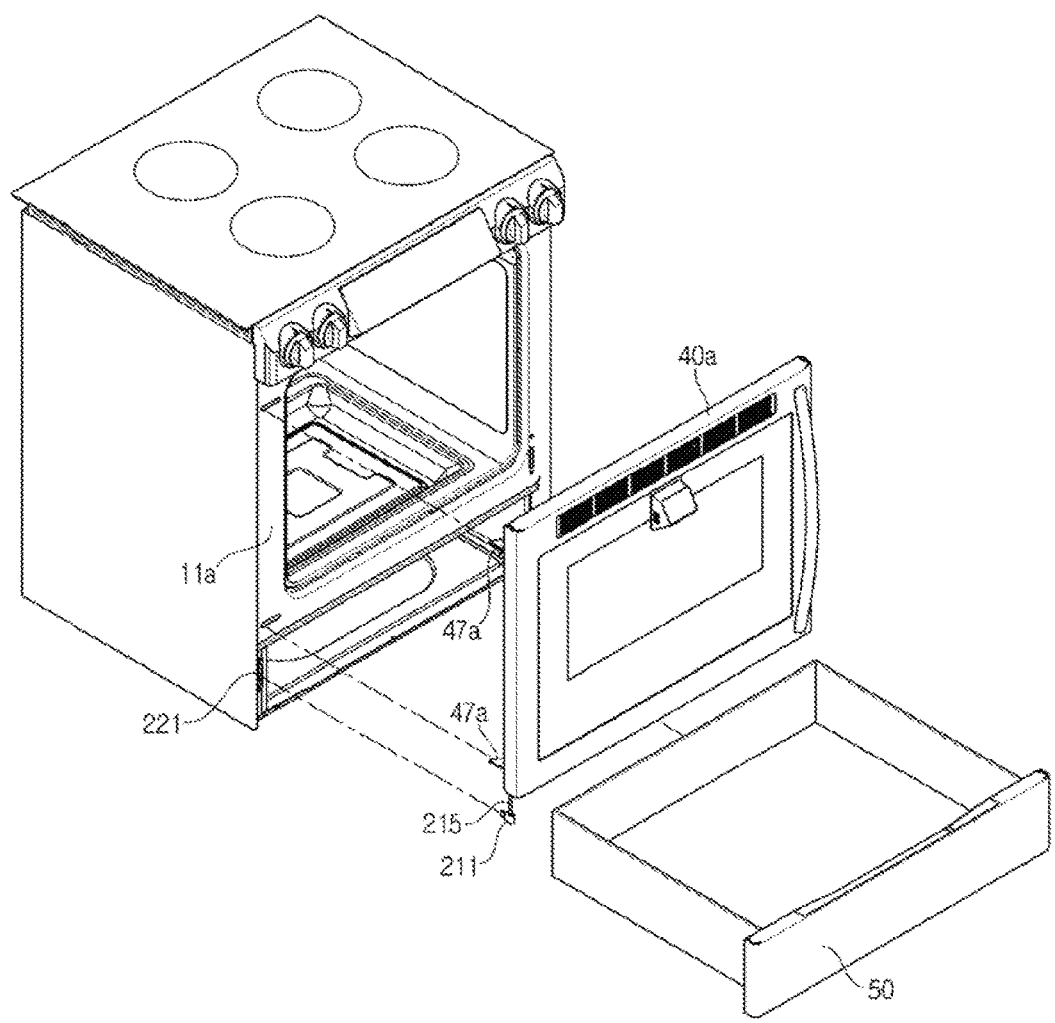
FIG. 20 is a front view illustrating a state in which a storage compartment of the oven in accordance with another embodiment of the present disclosure is removed.

FIG. 18 is a perspective view of an oven in accordance with another embodiment of the present disclosure. FIG. 19 is a view illustrating a state in which a door of the oven in accordance with another embodiment of the present disclosure is opened. FIG. 20 is a front view illustrating a state in which a storage compartment of the oven in accordance with another embodiment of the present disclosure is removed.

As shown in FIGS. 18 and 19, the oven 1a may include a door 40a provided to open and close the opening 12 of the cooking compartment 20 to the left and right.

A hinge portion 47a provided to allow the door 40a to be pivotable with respect to the case 10 may be provided on a rear side of the door 40a. The hinge portion 47a is provided on a left portion or a right portion of the rear side of the door 40a to allow the door 40a to pivot with respect to the case 10 toward one side.

A hinge groove provided to allow the hinge portion 47a to be inserted and fixed to be pivotable and separable may be provided on a side of a front panel 11a corresponding to the hinge portion 47a.

The hinge groove may be provided on a left portion or a right portion of the front panel 11a to correspond to the hinge portion 47a.

The first cable 210 which passes through the inside of the door 40a and extends to be exposed from an outside of a bottom end of the door 40a may extend below the door 40a to provide the separation section 230 at the position corresponding to the height of the storage compartment 50 like one embodiment of the present disclosure described above.

Accordingly, as shown in FIG. 20, to separate the door 40a from the case 10, it is necessary to slide the storage compartment 50 open to expose the separation section 230 outside and to separate the first cable 210 from the second cable 220.

Since the separation section 230 is provided to be at an approximate right angle with a direction in which the door 40a pivots, the separation section 230 may interrupt the pivoting of the door 40a.

Accordingly, the exposed portion 215 at which the separation section 230 is positioned and which extends outside the door 40a may be provided to be adjacent to a pivoting shaft of the door 40a so as not to interrupt the pivoting of the door 40a.

Hereinafter, a connection structure of the cable 200 in accordance with still another embodiment of the present disclosure will be described. Since components of an oven 1b other than components to be described hereafter are identical to those in accordance with another embodiment of the present disclosure described above, a repetitive description thereof will be omitted.

Figure 21:
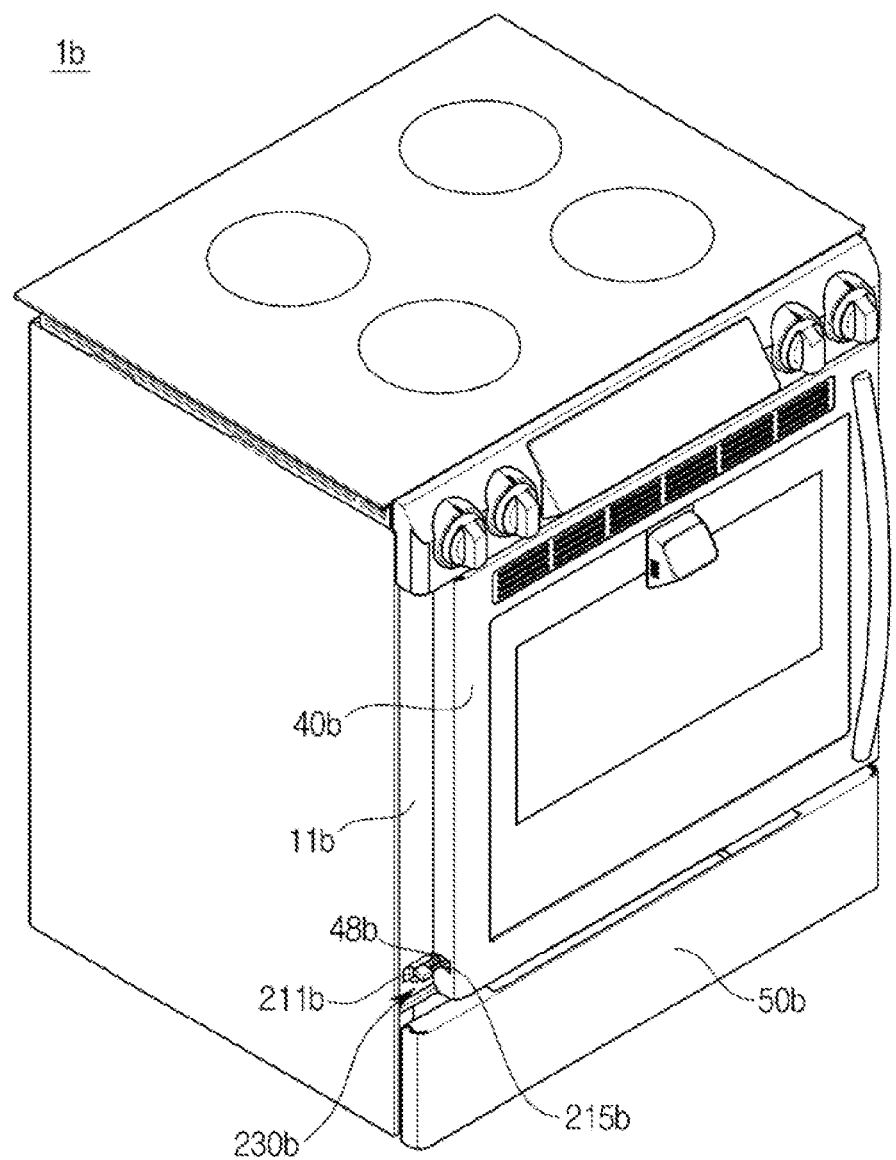
FIG. 21 is a perspective view of an oven in accordance with still another embodiment of the present disclosure.
Figure 22:
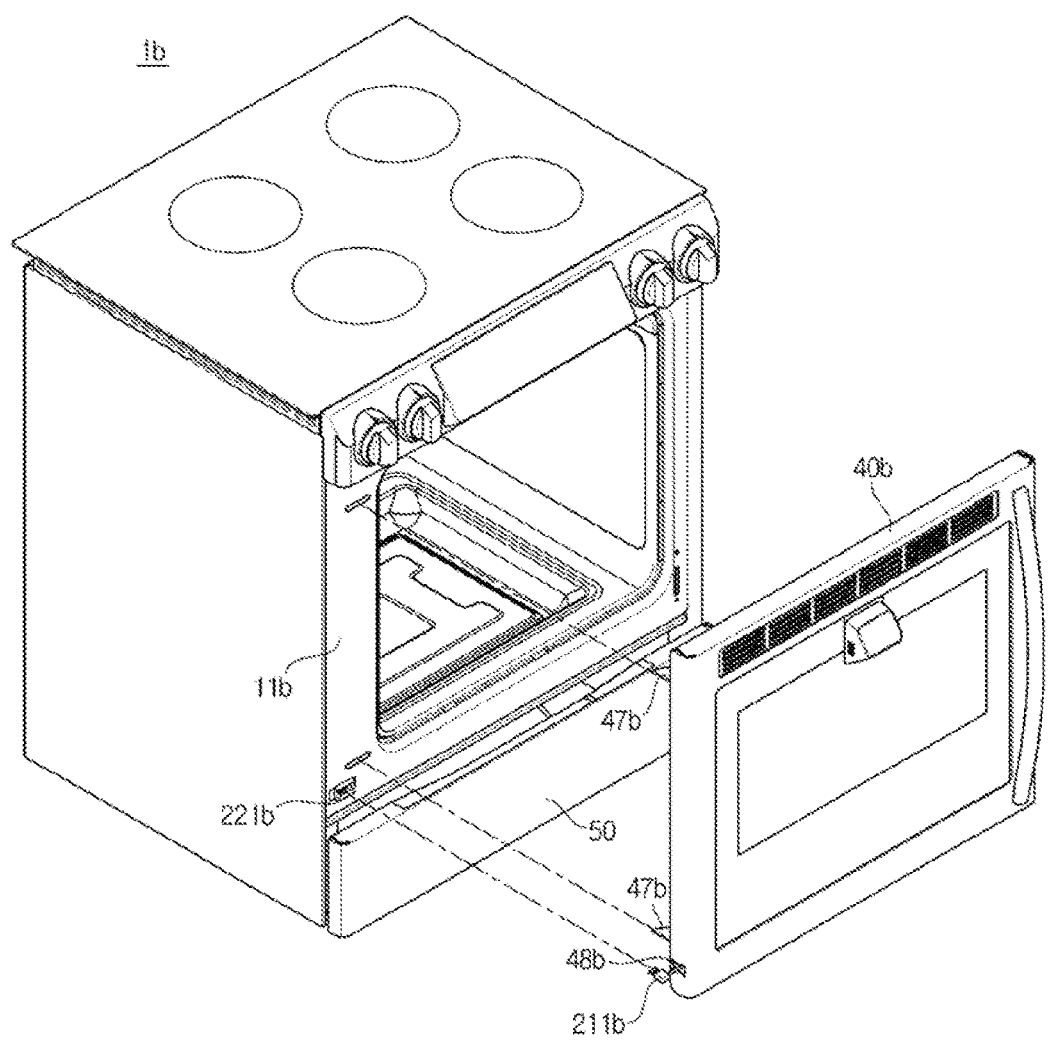
FIG. 22 is an exploded perspective view illustrating a state in which a door of the oven in accordance with still another embodiment of the present disclosure is separated.
Figure 23:
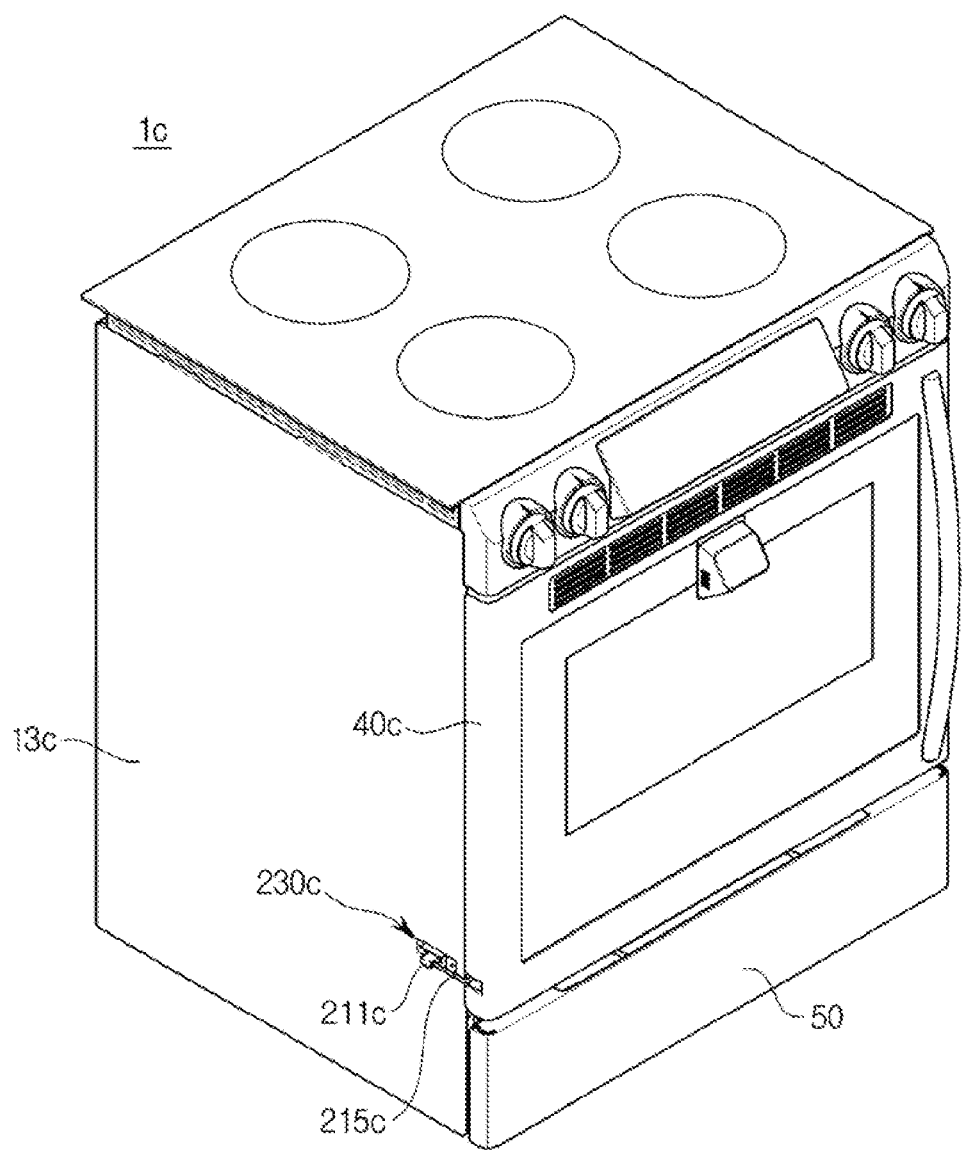
FIG. 23 is a perspective view of an oven in accordance with yet another embodiment of the present disclosure.

FIG. 21 is a perspective view of an oven in accordance with still another embodiment of the present disclosure. FIG. 22 is an exploded perspective view illustrating a state in which a door of the oven in accordance with still another embodiment of the present disclosure is separated. FIG. 23 is a perspective view of an oven in accordance with yet another embodiment of the present disclosure.

As shown in FIG. 21, the oven 1b may include a door 40b provided to open and close the opening 12 of the cooking compartment 20 to the left and right. A width of the door 40b may be provided to be shorter than a width of the case 10.

In detail, one end of the door 40b adjacent to a pivoting shaft may be provided to be shorter than one horizontal end of the case 10 and the other end of the door 40b may be provided to correspond to the other horizontal end of the case 10.

One side of a front panel 11b may be provided outside the one end of the door 40b to be exposed outside the oven 1b.

A first cable 210b may include an exposed portion 215b which extends outside a side portion of the door 40b adjacent to the pivoting shaft. Unlike the embodiments of the present disclosure described above, the exposed portion 215b may be provided to pass through the side portion of the door 40b and to be exposed to the outside.

Accordingly, a separation section 230b may be positioned beside the door 40b and not below it. In detail, the separation section 230b may be provided laterally outside the door 40b and positioned on the one side of the front panel 11b exposed to the outside.

That is, a first coupling member 211b and a second coupling member 221b may be provided on the front panel 11b exposed to the outside to be couplable with and separable from each other and may be provided between the side portion of the door 40b and a position corresponding thereto.

Since the first coupling member 211b and the second coupling member 221b are positioned on an outside of the door 40b adjacent to the pivoting shaft, when the door 40b pivots, the first coupling member 211b is positioned within a pivoting radius of the door 40b, thereby interrupting the pivoting of the door 40b.

That is, when the door 40b pivots, since the first coupling member 211b and the one end of the door 40b may come into contact with each other, the pivoting of the door 40b may be restricted.

To prevent this, an insertion hole 48b through which the first coupling member 211b is inserted into the door 40b may be provided at a position which comes into contact with the first coupling member 211b when the door 40b pivots to avoid an interruption to the pivoting of the door 40b.

The insertion hole 48b may be provided on the side portion of the door 40b and may be provided to correspond to a size of the first coupling member 211b. Also, the exposed portion 215b of the first cable 210b may be provided to extend outside the door 40b through the insertion hole 48b.

As shown in FIG. 22, when the door 40b is separated from the case 10, unlike the embodiments described above, the user may separate the cable 200 by pulling the first coupling member 211b exposed to the outside without needing to open the storage compartment 50, and then may separate the door 40b.

Hereinafter, a connection structure of the cable 200 in accordance with still another embodiment of the present disclosure will be described. Since components of an oven 1c other than components to be described hereafter are identical to those in accordance with still another embodiment of the present disclosure described above, a repetitive description thereof will be omitted.

As shown in FIG. 23, a separation section 230c of the cable 200 may be provided on a side panel 13c of the case 10.

That is, a first cable 210c may include an exposed portion 215c which extends outside a side portion of the door 40c adjacent to a pivoting shaft. The exposed portion 215c may be provided to pass through the side portion of the door 40c and extend to the side panel 13c.

Accordingly, the separation section 230c may be positioned beside the door 40c and not below it, and may be positioned at a side portion of the oven 1c and not at a front portion thereof. In detail, the separation section 230b may be positioned on the one side of the front panel 11b provided laterally outside the door 40b and exposed to the outside.

Accordingly, the user may separate the cable 200 by pulling the first coupling member 211c positioned on the side panel 13c exposed to the outside without needing to open the storage compartment 50 when the door 40c is separated from the case 10, and then may separate the door 40c from the case 10.

Hereinafter, a connection structure of the cable 200 in accordance with still yet another embodiment of the present disclosure will be described. Since components of an oven 1d other than components to be described hereafter are identical to those in accordance with yet another embodiment of the present disclosure described above, a repetitive description thereof will be omitted.

Figure 24:
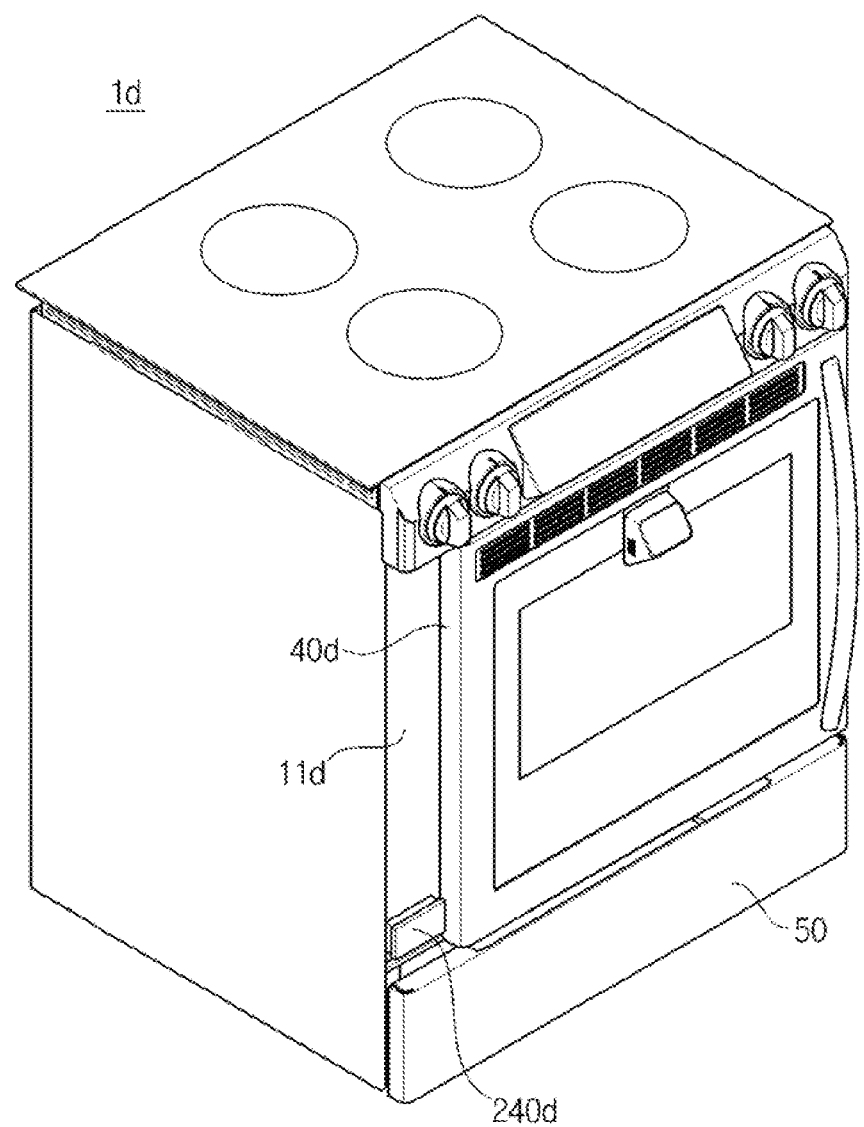
FIG. 24 is a perspective view of an oven in accordance with still yet another embodiment of the present disclosure.
Figure 25:
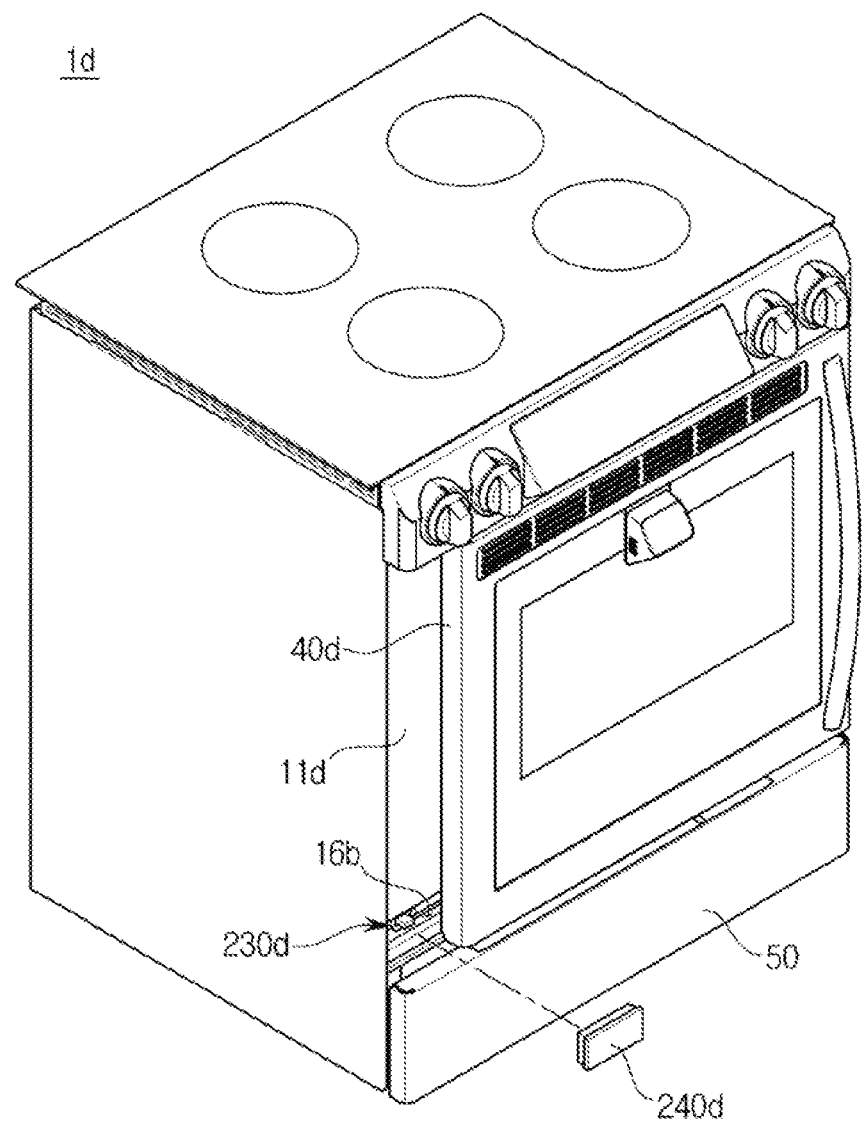
FIG. 25 is an exploded perspective view illustrating a state in which one component of the oven in accordance with still yet another embodiment of the present disclosure is separated.
Figure 26:
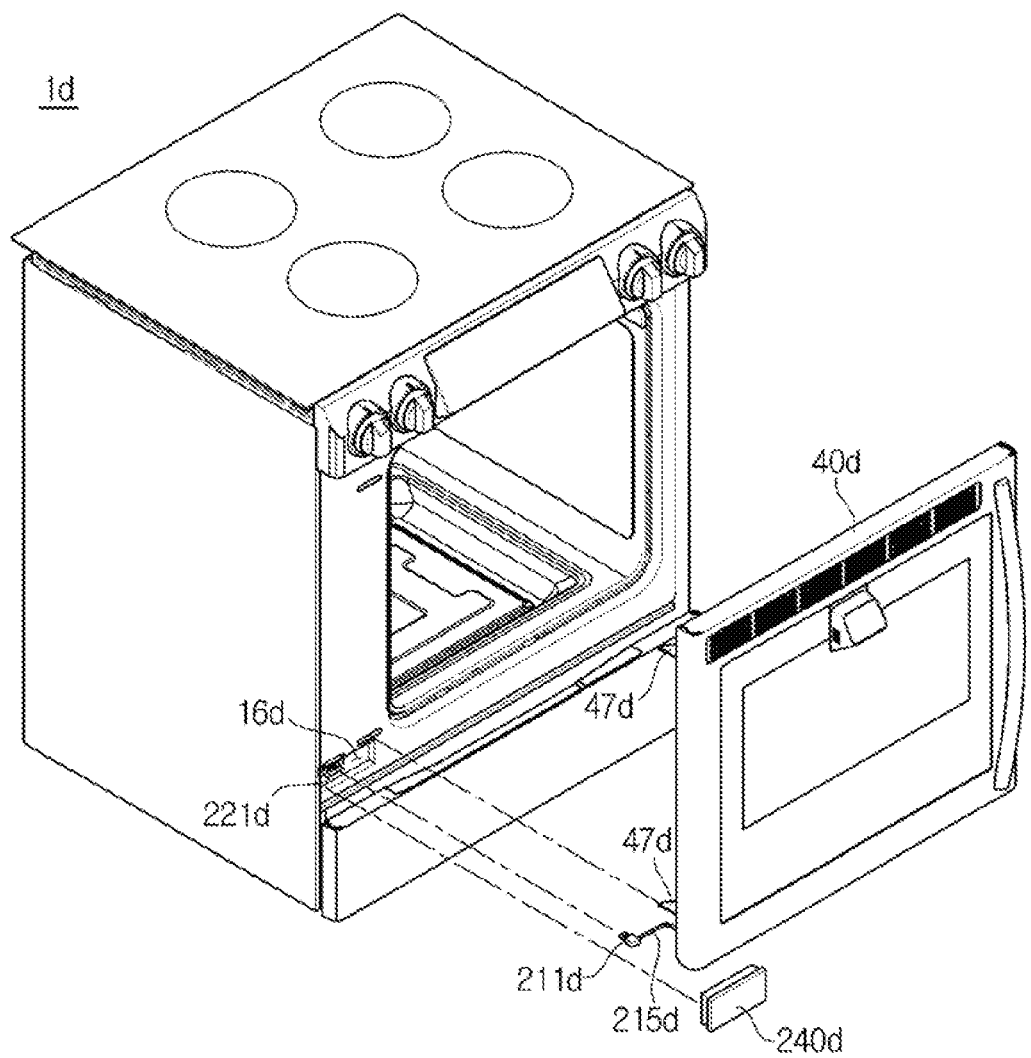
FIG. 26 is an exploded perspective view illustrating a state in which some components of the oven in accordance with still yet another embodiment of the present disclosure are separated.

FIG. 24 is a perspective view of an oven in accordance with still yet another embodiment of the present disclosure. FIG. 25 is an exploded perspective view illustrating a state in which one component of the oven in accordance with still yet another embodiment of the present disclosure is separated. FIG. 26 is an exploded perspective view illustrating a state in which some components of the oven are in accordance with still yet another embodiment of the present disclosure are separated.

As shown in FIGS. 24 and 25, the oven 1d may include a door 40d provided to open and close the opening 12 of the cooking compartment 20 to the left and right. A width of the door 40d may be provided to be shorter than the width of the case 10.

In detail, one end of the door 40d adjacent to a pivoting shaft may be provided to be shorter than one horizontal end of the case 10, and the other end of the door 40d may be provided to correspond to the other horizontal end of the case 10.

One side of a front panel 11d may be provided outside the one end of the door 40d to be exposed outside the oven 1d.

A first cable 210d may include an exposed portion 215d which extends outside a side portion of the door 40d adjacent to the pivoting shaft. The exposed portion 215d may be provided to pass through a rear portion of the door 40d and to extend to a side of the door 40d to be exposed to the outside.

Accordingly, a separation section 230d may be positioned beside the door 40d and not below it. In detail, the separation section 230d may be provided laterally outside the door 40d and may be positioned on one side of the front panel 11d exposed to the outside.

That is, a first coupling member 211d and a second coupling member 221d may be provided on the front panel 11d exposed to the outside to be couplable with and separable from each other, and may be provided between the side portion of the door 40d and a corresponding position corresponding thereto.

Since the first coupling member 211d and the second coupling member 221d are positioned on the outside of the door 40d adjacent to the pivoting shaft, when the door 40d pivots, the first coupling member 211d is positioned within a pivoting radius of the door 40d, thereby interrupting the pivoting of the door 40d.

That is, when the door 40d pivots, since the first coupling member 211d and the one end of the door 40d may come into contact with each other, the pivoting of the door 40d may be restricted.

To prevent this, the separation section 230d may be positioned at an insertion portion 16d provided at the front panel 11d and provided to be concave toward a rear of the oven 1d.

The insertion portion 16d may be provided on the front panel 11d to be concave toward an inside of the case 10 to provide a space separated from a front side of the front panel 11d.

A distance between the insertion portion 16d and the front side of the front panel 11d may be larger than a thickness of the door 40d. This is to position the exposed portion 215d of the first cable 210d, which passes through a rear of the door 40d and extends to the outside, inside the insertion portion 16d.

Since the exposed portion 215d is provided inside a space of the insertion portion 16d and the separation section 230d is positioned on a front of the insertion portion 16d, the exposed portion 215d or the first coupling member 211d may be provided to be spaced apart from the pivoting radius of the door 40d when the door 40d is opened.

Due to this, the exposed portion 215d and the first coupling member 211d may be provided so as not to interrupt opening of the door 40d.

A cover member 240d capable of covering the insertion portion 16d may be provided in front of the insertion portion 16d. The cover member 240d may be provided with a size corresponding to the front of the insertion portion 16d and may be disposed to be separable from the insertion portion 16d.

Due to the cover member 240d, a front aesthetic shape of the oven 1d may be uniformly maintained and the cable 200 may be prevented from being separated by a force applied to the separation section 230d.

As shown in FIG. 25, when the door 40d is separated from the case 10, the user may separate the cover member 240d without needing to open the storage compartment 50, may separate the cable 200 by pulling the first coupling member 211d exposed to the outside, and then may separate the door 40b.

Hereinafter, a connection structure of the cable 200 in accordance with a further embodiment of the present disclosure will be described. Since components of an oven 1e other than components to be described hereafter are identical to those in accordance with even another embodiment of the present disclosure described above, a repetitive description thereof will be omitted.

Figure 27:
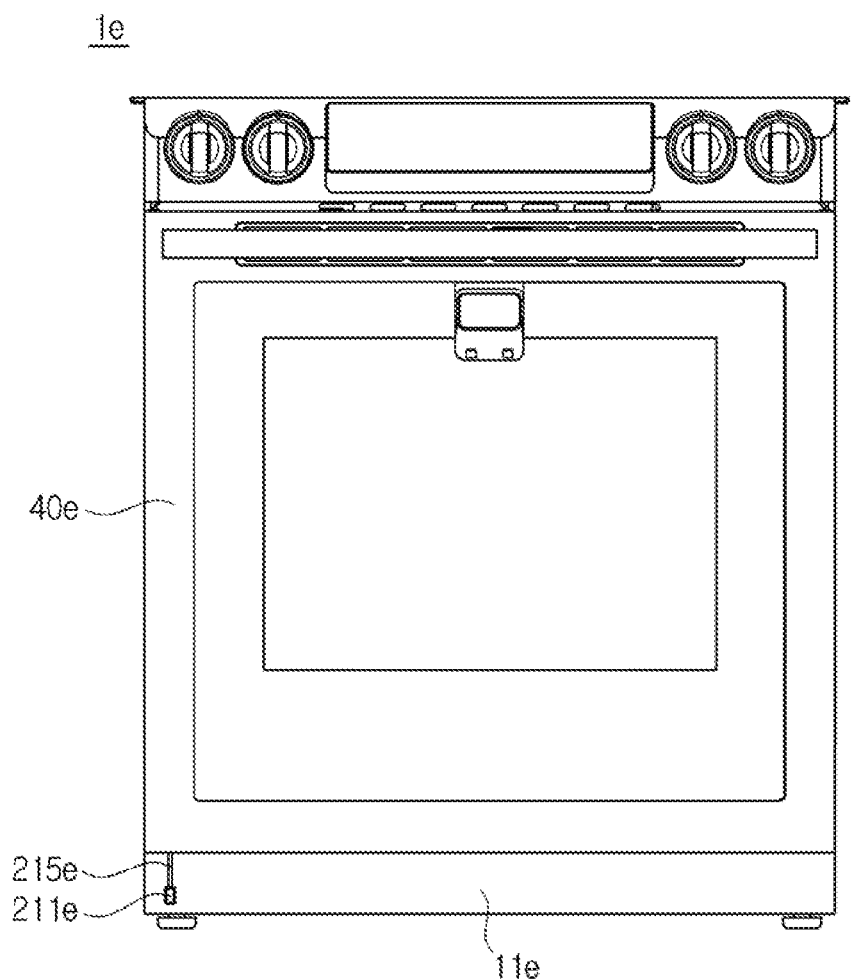
FIG. 27 is a front view of an oven in accordance with a further embodiment of the present disclosure.
Figure 28:
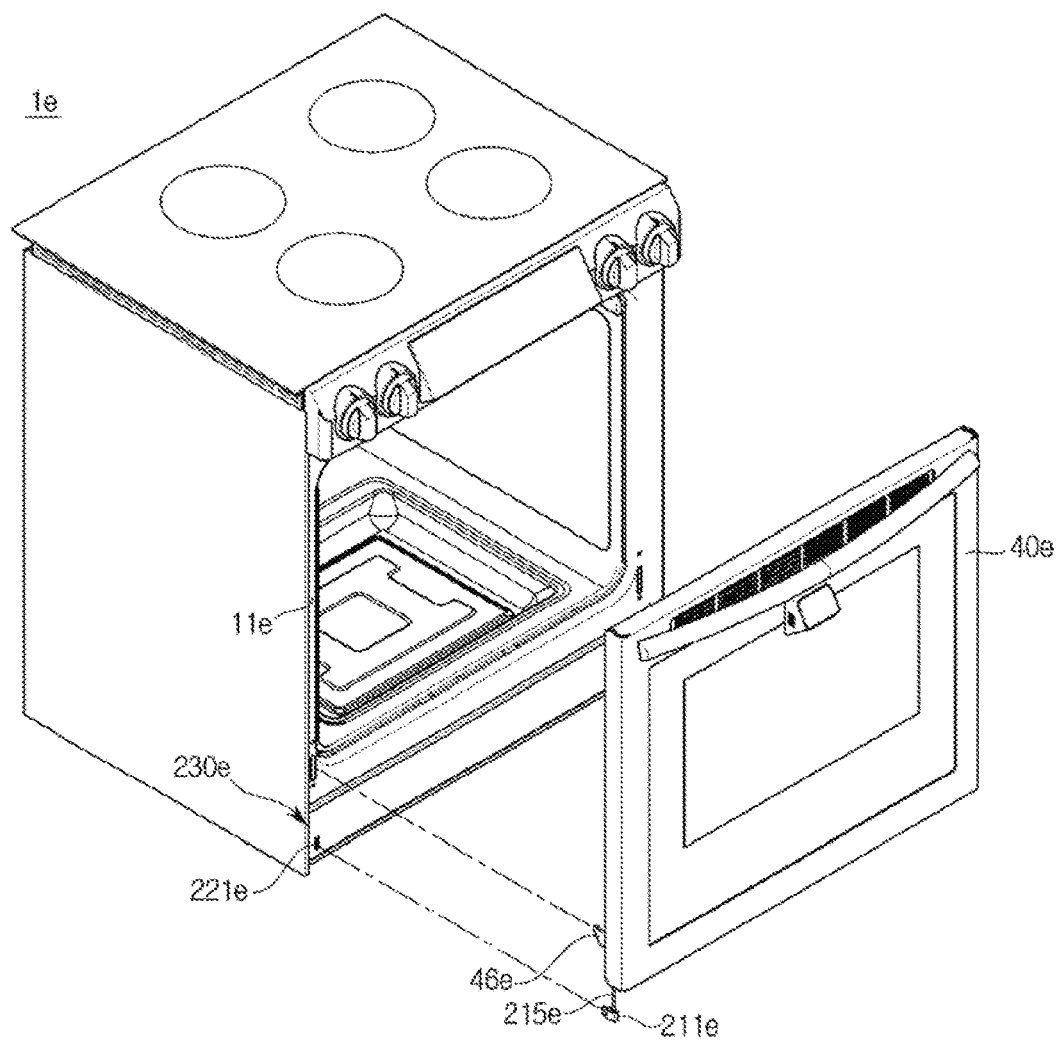
FIG. 28 is an exploded perspective view illustrating a state in which a door of the oven in accordance with the further embodiment of the present disclosure is separated.

FIG. 27 is a perspective view of an oven in accordance with the further embodiment of the present disclosure. FIG. 28 is an exploded perspective view illustrating a state in which a door of the oven in accordance with the further embodiment of the present disclosure is separated.

According to the further embodiment of the present disclosure, unlike the embodiments described above, the storage compartment 50 may not be included. Accordingly, the cooking compartment 20 may be enlarged into a space for the storage compartment 50.

An exposed portion 215e may pass through a bottom of a door 40e to be exposed to the outside, and a separation section 230e may be provided outside a bottom end of the door 40e.

In detail, the separation section 230e may be provided on a front panel 11e exposed outside the bottom of the door 40e. Accordingly, a first coupling member 211e and a second coupling member 221e may be provided on the front panel 11e to be couplable with and separable from each other.

To prevent an interruption of the first coupling member 211e when the door 40e pivots, an insertion hole 48e may be provided at a position of the door 40e corresponding to the first coupling member 211e.

The insertion hole 48e may be provided on a side portion of the door 40e and may be provided to correspond to a size of the first coupling member 211e. Also, the exposed portion 215e of a first cable 210e may be provided to extend outside the door 40e through the insertion hole 48e.

To separate the door 40e, the user may pull the first coupling member 211e positioned below the door 40e to separate it from the second coupling member 221e, and then may separate the door 40e from the case 10.

Hereinafter, a connection structure of the cable 200 in accordance with a still further embodiment of the present disclosure will be described. Since components of an oven 1f other than components to be described hereafter are identical to those in accordance with the further embodiment of the present disclosure described above, a repetitive description thereof will be omitted.

Figure 29:
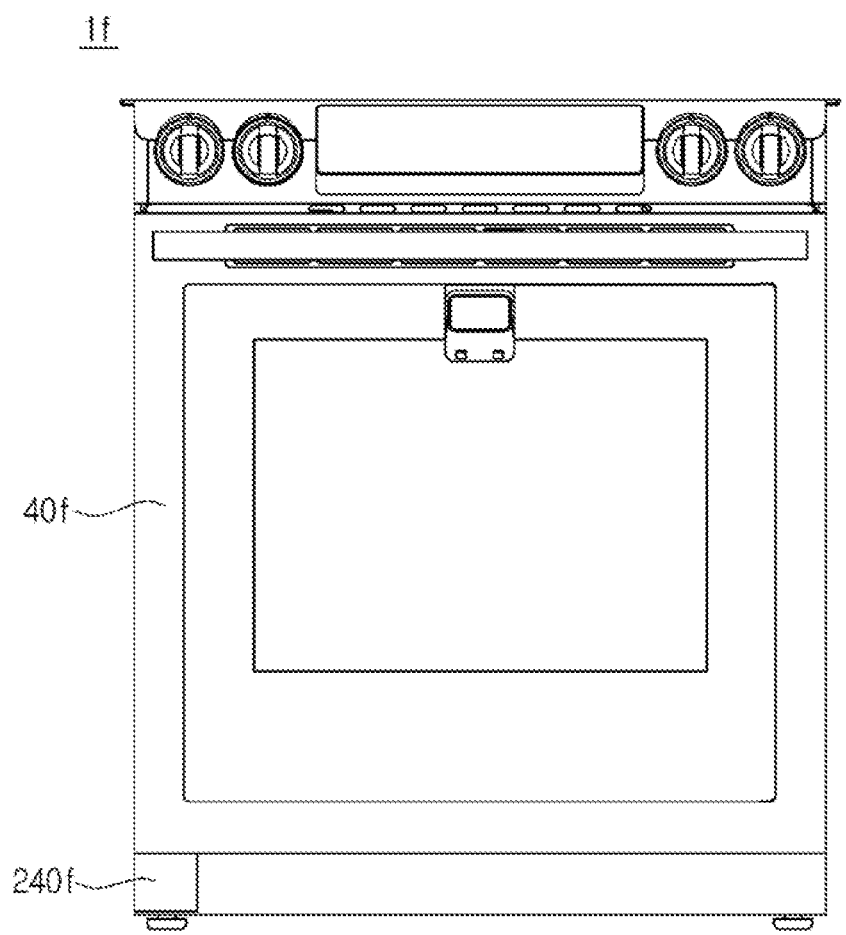
FIG. 29 is a front view of an oven in accordance with a still further embodiment of the present disclosure.
Figure 30:
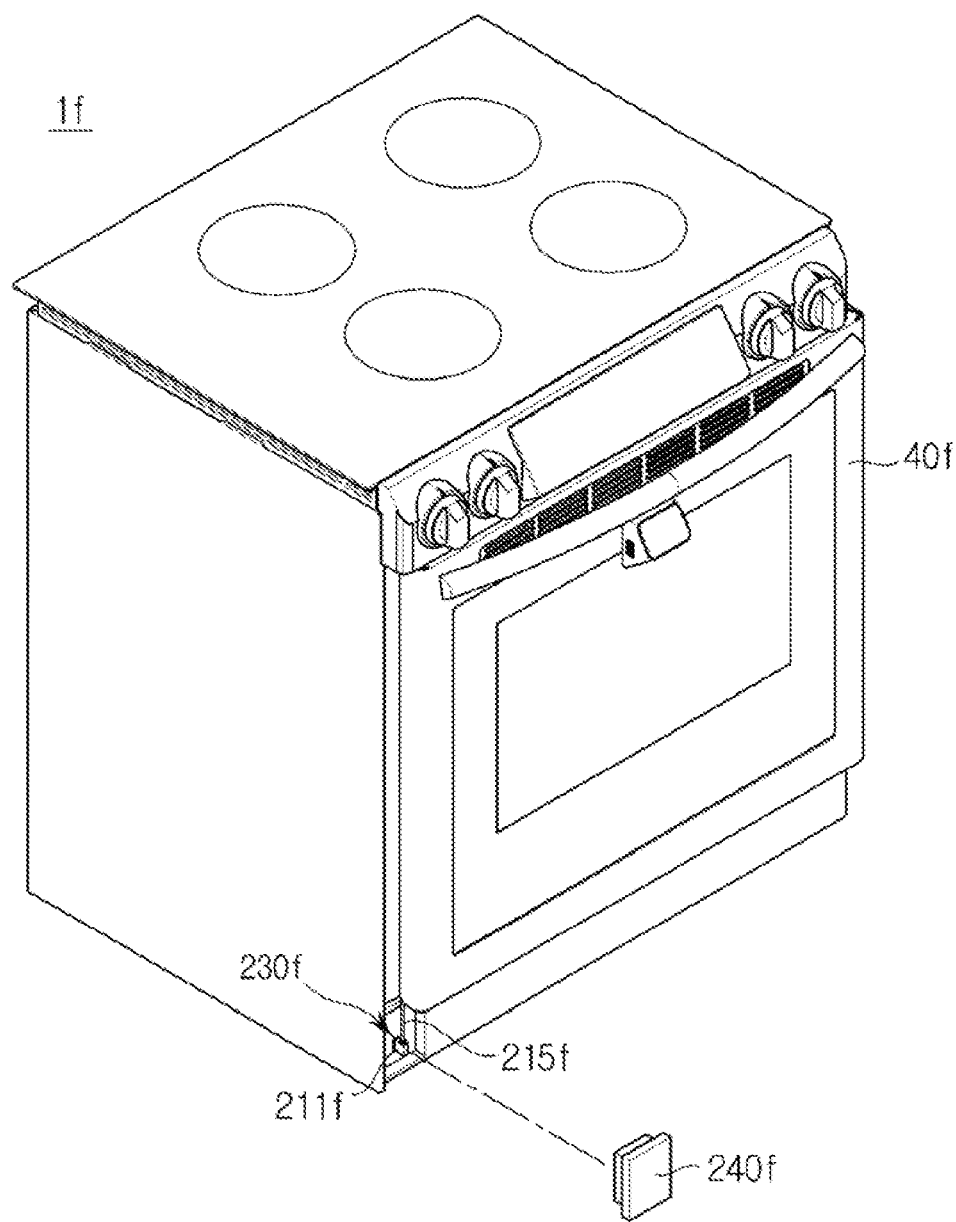
FIG. 30 is an exploded perspective view illustrating a state in which one component of the oven in accordance with the still further embodiment of the present disclosure is separated.
Figure 31:
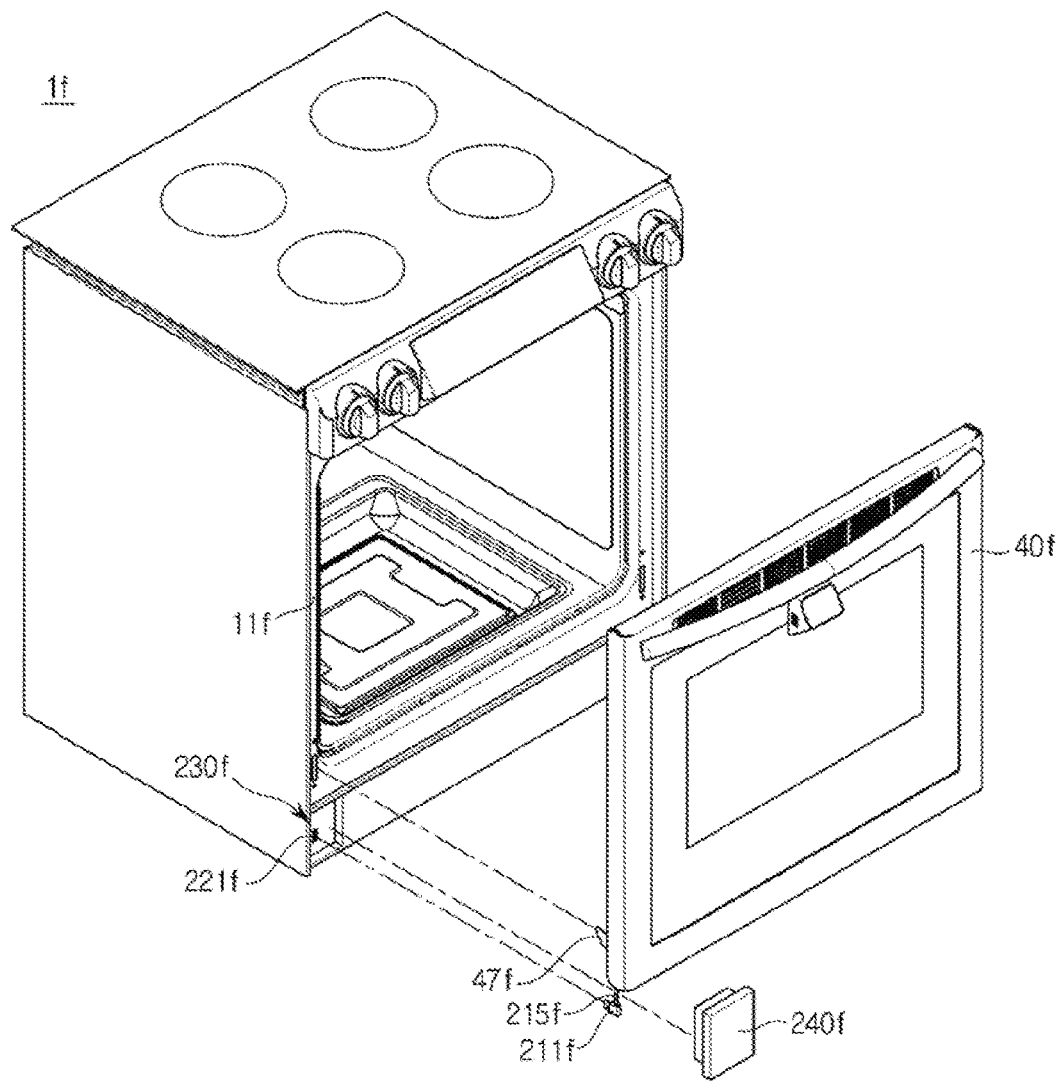
FIG. 31 is an exploded perspective view illustrating a state in which some components of the oven in accordance with the still further embodiment of the present disclosure are separated.

FIG. 29 is a perspective view of an oven in accordance with the still further embodiment of the present disclosure. FIG. 30 is an exploded perspective view illustrating a state in which one component of the oven in accordance with the still further embodiment of the present disclosure is separated. FIG. 31 is an exploded perspective view illustrating a state in which some components of the oven in accordance with the still further embodiment of the present disclosure are separated.

An insertion portion 16f provided to be concave toward an inner surface of the case 10 may be provided below the door 40f. An exposed portion 215f which passes through a bottom surface of a rear surface of the door 40f and extends below the door 40f may be positioned in a space formed by the insertion portion 16f.

Also, a separation section 230f may be positioned on a front of the insertion portion 16f to allow the exposed portion 215f or a first coupling member 211f to be spaced apart from a pivoting radius of the door 40f when the door 40f is opened. Due to this, the exposed portion 215f and the first coupling member 211f may be provided so as not to interrupt opening of the door 40f.

A cover member 240f capable of covering the insertion portion 16f may be provided in front of the insertion portion 16f. The cover member 240f may be provided with a size corresponding to the front of the insertion portion 16f and may be disposed to be separable from the insertion portion 16f.

Hereinafter, a process through which the oven 1 transmits and receives information with an external device 1000 will be described in detail.

Figure 32:
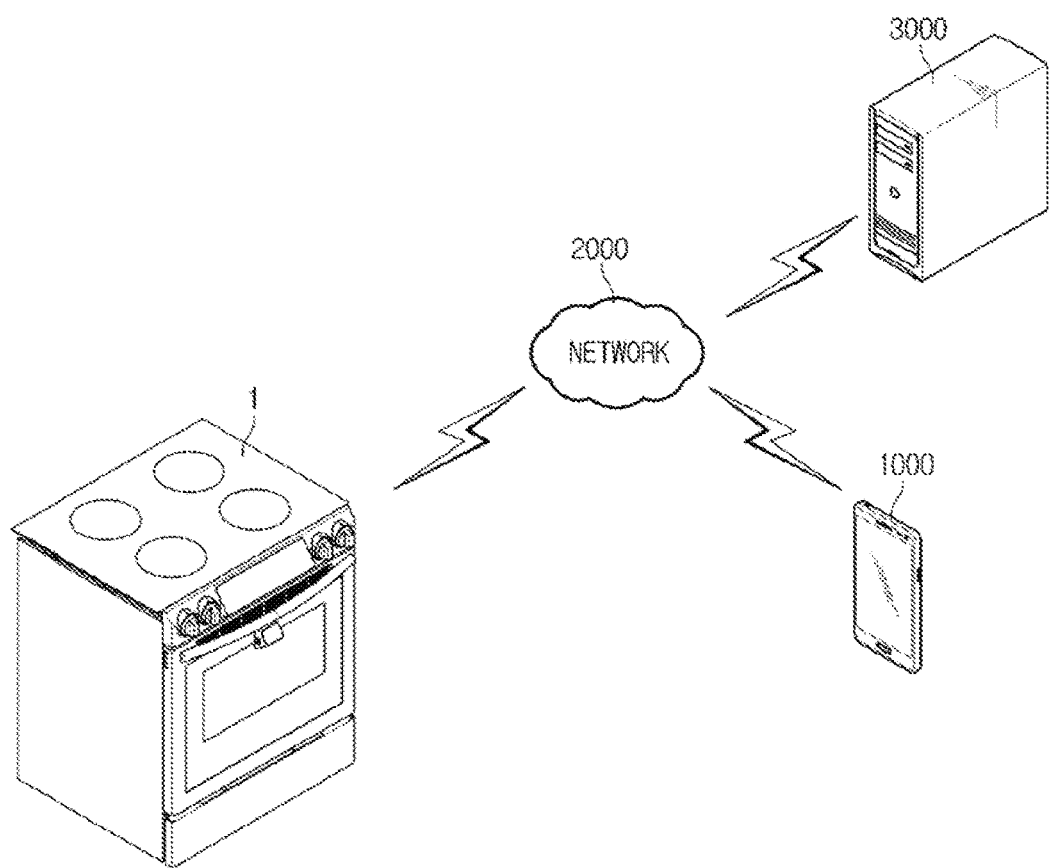
FIG. 32 is a schematic diagram illustrating a state in which the oven in accordance with one embodiment of the present disclosure communicates with an external device.
Figure 33:
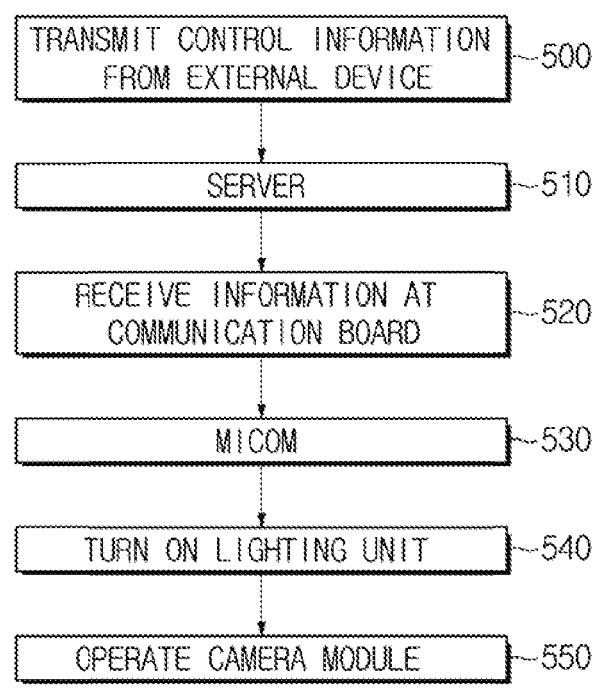
FIG. 33 is a flowchart illustrating operations of a process in which the oven in accordance with one embodiment of the present disclosure receives information from the external device.
Figure 34:
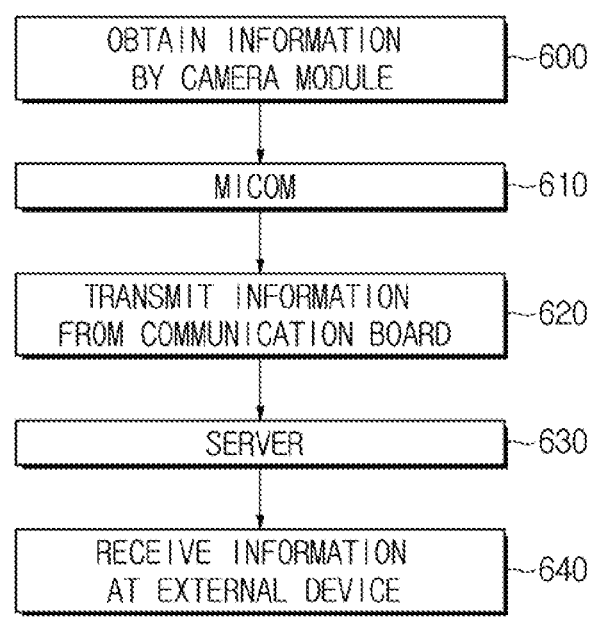
FIG. 34 is a flowchart illustrating operations of a process in which the oven in accordance with one embodiment of the present disclosure transmits information to the external device.

FIG. 32 is a schematic diagram illustrating a process in which the oven in accordance with one embodiment of the present disclosure communicates with an external device. FIG. 33 is a flowchart illustrating operations of a process in which the oven in accordance with one embodiment of the present disclosure receives information from the external device. FIG. 34 is a flowchart illustrating operations of a process in which the oven in accordance with one embodiment of the present disclosure transmits information to the external device.

The oven 1 may transmit and receive information with the external device 1000 through a network 2000 using the monitoring unit 100 provided in the oven 1.

The external device 1000 may generally be a mobile device such as a smart phone, a tablet phone, a cellular phone, a personal digital assistant (PDA), a laptop personal computer, a media player, a global positioning system (GPS), and other image display devices and may be various home appliances capable of communicating through a network and other home appliances. The external device 1000 will be described as, for example, a smart phone, in one embodiment, but is not limited thereto.

The network 2000 may be embodied as a wired network such as an LAN, a wide area network (WAN), a value-added network (VAN), etc. or a wireless network such as a mobile radio communication network, an NFC, a satellite communication network, etc. Also, the network 2000 is a data communication network in a comprehensive meaning that allows components of each network shown in FIG. 1 to smoothly communicate with one another and may include wired Internet, wireless Internet, and a mobile wireless communication network.

A process through which the external device 1000 operates the monitoring unit 100 starts with transmitting information from the external device 1000 over the network 2000 using a program such as an app, etc. (S500).

A user may transmit control information which allows the monitoring unit 100 to take the image of the inside of the cooking compartment 20 using the external device 1000 through the app over the network 2000.

The information transmitted over the network 2000 may be received by a server 3000 through a communication network (S510).

Apparatus information of the external device 1000 and the oven 1 of the user should be pre-registered in the server 3000. Due to the registration, the authority to control the registered oven 1 using a control means such as an app is given to the external device 1000 through the apparatus information.

Accordingly, according to stored apparatus information, the server 3000 may transmit information received from the registered external device 1000 to the registered oven 1.

After that, the information transmitted from the server 3000 may be received by the communication board 120 of the monitoring unit 100 (S520).

The communication board 120, as described above, may transmit and receive information through Wi-Fi or data transmission.

After that, the information received by the communication board 120 is transmitted to the micom 300 which controls the monitoring unit 100 (S530).

The information received by the communication board 120 may be transmitted to the micom 300 through the cable 200 or another data transmission method such as a wireless communication network.

When the user transmits the control information for operating the monitoring unit 100 through the external device 10000, the micom 300 proactively controls a lighting unit (not shown) provided at the cooking compartment 20 (S540). In detail, the lighting unit is turned on to allow the camera module 110 to smoothly take the image.

When the lighting unit is turned and a certain time passes, the micom 300 may allow the cameral module 110 to operate (S550).

The user may selectively request an image, a plurality of images taken with time differences, or moving image information of the inside of the cooking compartment 20 using the external device 1000. Accordingly, the control information may be selectively received from the external device 1000, and the micom 300 may operate the camera module 110 according to the received information.

Under the control of the micom 300, the camera module 110 is operated and may obtain information by taking the image of the inside of the cooking compartment 20. In operation S600 which obtains information from the camera module 110, as described above, information corresponding to information requested by the user is obtained under the control of the micom 300.

After that, the operating of the camera module 110 is finished, information on the end of the operating may be transmitted to the micom 300 (S610).

The micom 300 transmits information collected by the camera module 110 over the network 2000 by controlling the communication board 120 (S620).

The information on the network 2000 is again transmitted to the server 3000. The server 3000 transmits the information, which is transmitted from the communication board 120 to the external device 1000, to the external device 1000 according to the apparatus information stored in the server 3000 (S630).

The information transmitted from the server 3000 is again received by the external device 1000 through the network 2000 (S640) to allow the user to monitor the internal state of the cooking compartment 20 through the app provided at the external device 1000.

The external device 1000 may transmit the control information for operating the camera module 110 as well as control information for adjusting a cooking environment in the oven 1 in consideration the images of the cooking compartment 20 transmitted by the camera module 110.

That is, according to the transmitted information, control information for adjusting an internal temperature of the cooking compartment 20 of the oven 1 or a cooking time may be transmitted to the oven 1. Through the server 3000, the control information may pass through the communication board 120 and may be received by the micom 300 to adjust the cooking environment of the oven 1 according to the control information.

Hereinafter, a display module 60*a* in accordance with a yet further embodiment of the present disclosure will be described. Since components of the oven 1 other than components to be described hereafter are identical to those in accordance with the embodiments of the present disclosure described above, a repetitive description thereof will be omitted.

Figure 35:
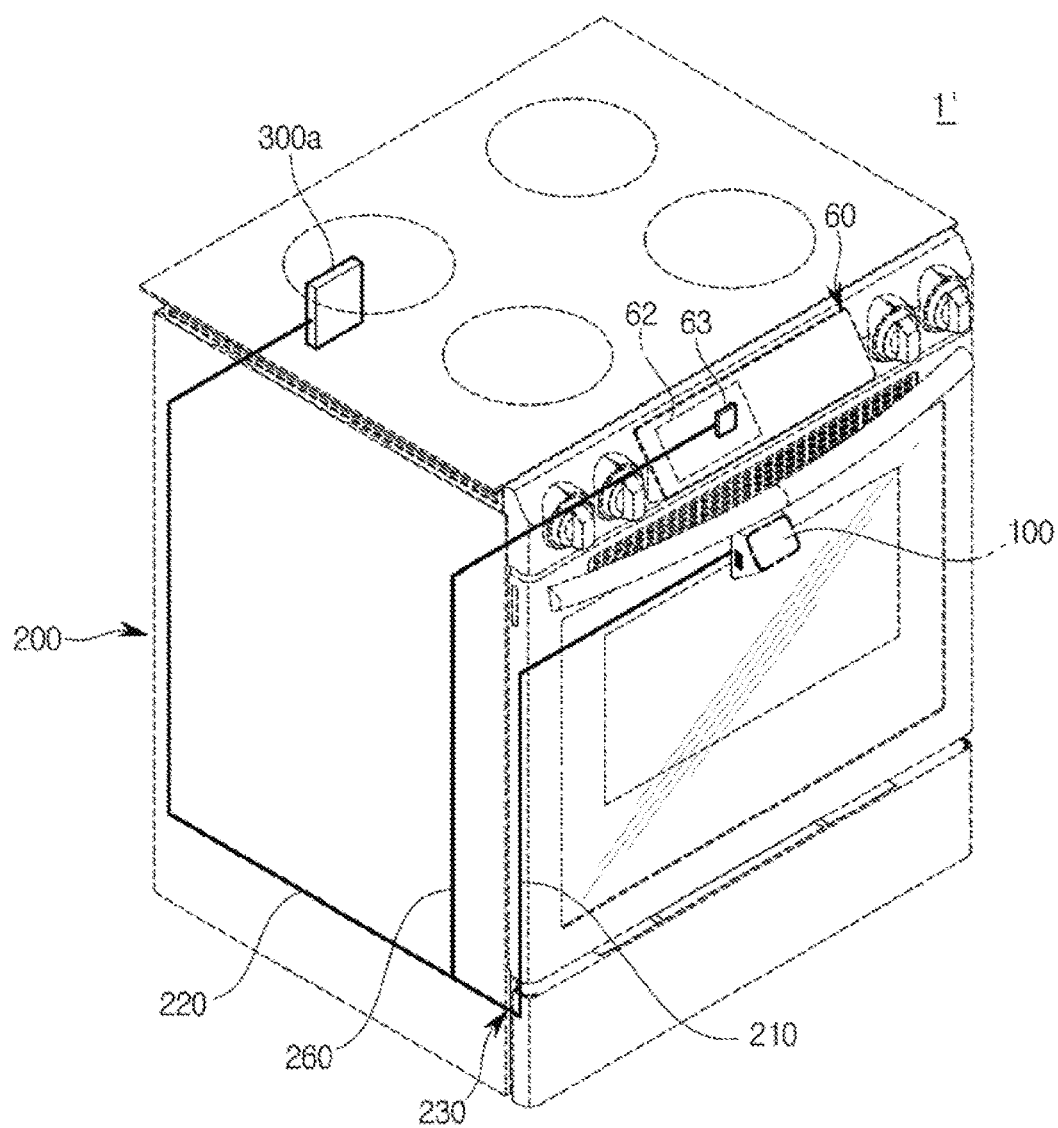
FIG. 35 is a perspective view of an oven in accordance with a yet further embodiment of the present disclosure.
Figure 36:
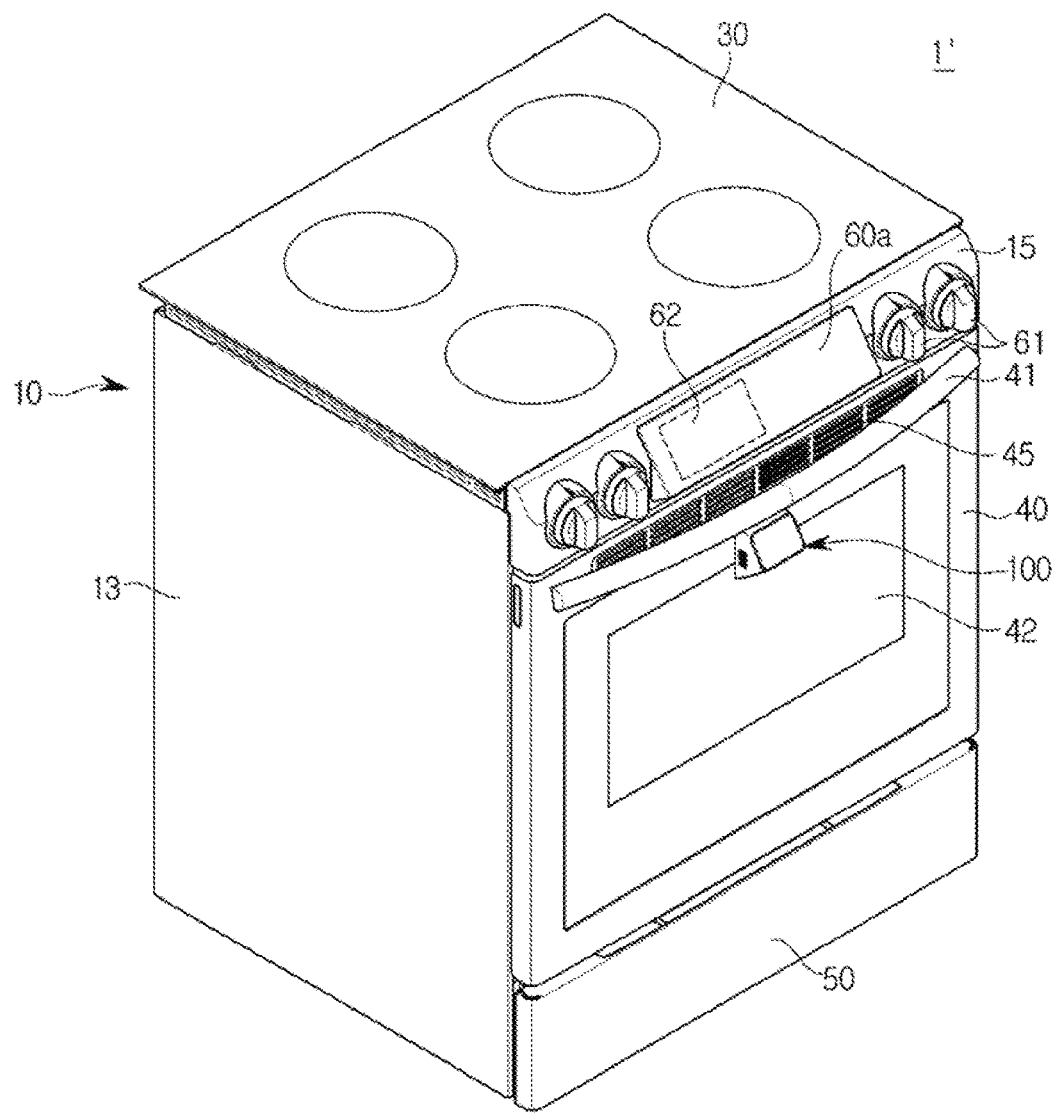
FIG. 36 is a view illustrating a state in which a cable in accordance with the yet further embodiment of the present disclosure is disposed inside a door.
Figure 37:
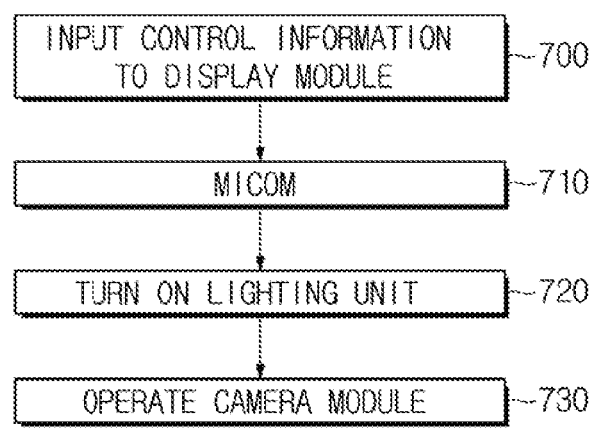
FIG. 37 is a flowchart illustrating operations of a process in which the oven in accordance with the yet further embodiment of the present disclosure receives information from a display module and a monitoring unit is operated.
Figure 38:
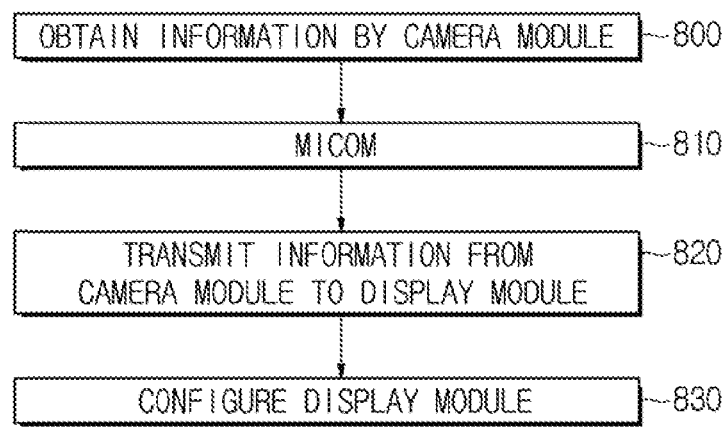
FIG. 38 is a flowchart illustrating operations of a process in which an image of ingredients is displayed on the display module of the oven in accordance with the yet further embodiment of the present disclosure.

FIG. 35 is a perspective view of an oven in accordance with the yet further embodiment of the present disclosure. FIG. 36 is a view illustrating a state in which a cable is disposed inside a door in accordance with the yet further embodiment of the present disclosure. FIG. 37 is a flowchart illustrating operations of a state in which the oven in accordance with the yet further embodiment of the present disclosure receives information from a display module and a monitoring unit is operated. FIG. 38 is a flowchart illustrating operations of a state in which an image of ingredients is displayed on the display module of the oven in accordance with the yet further embodiment of the present disclosure.

Image information of the cooking compartment 20 of the oven 1 in accordance with yet further embodiment of the present disclosure may be displayed on the external device 1000 through the network 2000 as described above or may be displayed on the display module 60*a*.

That is, a micom 300*a* may transmit the image information to the external device 1000 according to an input of control information by a user or may transmit the image information to the display module 60*a*.

The display module 60*a* may include an image display portion 62 capable of displaying the image information. The image display portion 62 displays the image information obtained by the monitoring unit 100 to allow the user to easily observe the inside of the cooking compartment 20 without having to lower his or her head to look through the transparent portion 42 provided at the door 40.

A display module control portion 63 which controls the display module 60*a* may be provided at the electronic device compartment 70. The display module control portion 63 may control the display module 60a to display the image information transmitted from the monitoring unit 100 on the display module 60a.

A third cable 260 which electrically connects the display module control portion 63 and the monitoring unit 100 may be provided therebetween. The third cable 250 may transmit the image information obtained by the monitoring unit 100 to the display module control portion 63 to display the image information on the image display portion 62.

One end of the third cable 250 may be connected to the display module control portion 63 and the other end of the third cable 250 may be connected to the second cable 220 to be electrically connected to the monitoring unit 100.

That is, the third cable 250 may be provided to allow information transferred through the second cable 220 to be transferred to the third cable 250 even though it is separated from the one side of the second cable 220.

Hereinafter, a process of displaying image information of the inside of the cooking compartment 20 on the display module 60a will be described in detail.

A user may input monitoring control information in the display module 60a (700). The user may input the control information by touching a display screen of the display module 60a or by using an operation portion (not shown) separately provided at the display module 60a.

The control information may be transmitted to the micom 300a through the cable 200 (S710).

The micom 300a may proactively operate the lighting unit according to the control information (S720).

After the lighting unit is operated and a certain time passes, the micom 300a may control the monitoring unit 100 to be operated (S730). The micom 300a may take the image of the cooking compartment 20 using various modes of the camera module 110 according to the control information input by the user.

The monitoring unit 100 may obtain image information through the camera module 110 and may transmit information about the operation to the micom 300a when the operating is finished (S800).

The micom 300a which receives the information may control the monitoring unit 100 to transmit the image information obtained by the monitoring unit 100 to the display module control portion 63 (S810).

Accordingly, the image information may be transmitted from the monitoring unit 100 to the display module control portion 63 (S820).

The display module control portion 63 which receives the image information may operate the display module 60a to display the received image information on the image display portion 62.

The micom 300a may transmit the image information to the external device 1000 through network 2000 or may transmit the information to the display module control portion 63 depending on the received information.

That is, when the control information is input from the external device 1000, a control function may be performed to operate the monitoring unit 100 and again transmit the obtained information to the external device. When the control information is input to the display module 60a, a control function may be selectively performed to operate the monitoring unit 100 to display the obtained information on the image display portion 62.

As is apparent from the above description, an oven in accordance with one embodiment of the present disclosure includes a monitoring unit to allow a user to check a cooking process using the monitoring unit without directly checking a transparent window of the oven or opening a door to check, which may improve user convenience.

Although a few embodiments of the present disclosure have been shown and described, it should be appreciated by those skilled in the art that changes may be made in these embodiments without departing from the principles and spirit of the present disclosure, the scope of which is defined in the claims and their equivalents.

What is claimed is:

1. An oven comprising:
a case;
a cooking compartment inside the case;
a door to respectively open and close the cooking compartment; and
a monitoring assembly including:
an image capturing portion having a camera, and
a housing which forms an exterior of the monitoring assembly,
wherein the monitoring assembly is disposed at a position on the door and the camera is moveable inside the housing to be at an angle at which an image of an inside of the cooking compartment is captured based on at least a height at which an object is placed inside the cooking compartment and a size of the cooking compartment.

2. The oven of claim 1, wherein the door comprises a transparent portion configured to allow the cooking compartment to be viewable from an outside of the oven, and
wherein the image capturing portion of the monitoring assembly is configured to capture the image of the inside of the cooking compartment through the transparent portion.

3. The oven of claim 2, wherein the monitoring assembly is positioned on an outer surface of the transparent portion at a location in which the camera of the image capturing portion views the inside of the cooking compartment in entirety according to the size of the cooking compartment.

4. The oven of claim 1, wherein the monitoring assembly further comprises:
a communication board which transmits information of the image captured by the camera of the image capturing portion to an external device through a network.

5. The oven of claim 1, wherein the camera of the image capturing portion is moved to the angle to be inclined with respect to an outer surface of the door.

6. The oven of claim 4,
wherein the communication board is disposed to be adjacent to an inner surface of the housing.

7. The oven of claim 6, wherein the housing comprises:
a first housing in which the image capturing portion having the camera and the communication board are mounted, and
a second housing configured to be attachable to an outer surface of the door and separable from the first housing.

8. The oven of claim 7, wherein an inner surface of the first housing comprises:
a first mounting portion on which the image capturing portion having the camera is mounted, and
a second mounting portion on which the communication board is mounted.

9. The oven of claim 1, further comprising:
a micom which controls the monitoring assembly; and
a cable which electrically connects the micom to the monitoring assembly.

10. The oven of claim 9, wherein a part of the cable is disposed inside the door and passes through the door to be connected to the monitoring assembly.

11. The oven of claim 9, wherein the cable comprises a first cable disposed inside the door and a second cable disposed inside the case, and
wherein the first cable and the second cable are separably provided.

12. The oven of claim 11, wherein the door is provided to be separable from the case, and
wherein the first cable and the second cable are provided to be separable from each other when the door is separated from the case.

13. The oven of claim 4, wherein the camera of the image capturing portion obtains the information of the image of the inside of the cooking compartment, for transmission by the communication board to the external device through the network.

14. The oven of claim 4, wherein the camera of the image capturing portion obtains a plurality of pieces of image information by capturing multiple images including the information of image of the inside of the cooking compartment at different times, and
wherein the communication board sequentially transmits the plurality of pieces of image information obtained by the camera of the image capturing portion to the external device through the network.

15. The oven of claim 4, wherein the camera of the image capturing portion obtains moving image information by capturing a moving image of the inside of the cooking compartment, and
wherein the communication board transmits the moving image information obtained by the camera of the image capturing portion to the external device through the network.

16. An oven comprising:
a case;
a cooking compartment inside the case; and
a monitoring assembly including:
a camera that is moveable, and
a housing which forms an exterior of the monitoring assembly,
wherein the monitoring assembly is disposed at a position on the case and the camera is moveable inside the housing to capture an image of an inside of the cooking compartment at an angle based on at least a height at which an object is placed inside the cooking compartment and a size of the cooking compartment, and transmits information of the image captured to an external device through a network.

17. The oven of claim 16, wherein the image of the inside of the cooking compartment is captured according to image-taking control information received by the monitoring assembly from the external device.

18. The oven of claim 17, wherein a lighting unit is provided in the cooking compartment, and
wherein the lighting unit is turned on before the camera captures the image of the inside of the cooking compartment.

19. The oven of claim 17, wherein the monitoring assembly obtains image information or moving image information of the captured image of the inside of the cooking compartment and transmits the image information or the moving image information according to the external device through the network.

* * * * *